United States Patent
Zhang et al.

(10) Patent No.: US 10,805,051 B2
(45) Date of Patent: Oct. 13, 2020

(54) WIFI CHANNEL AGGREGATION

(71) Applicant: Marvell World Trade Ltd., St. Michael (BB)

(72) Inventors: Hongyuan Zhang, Fremont, CA (US); Liwen Chu, San Ramon, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/162,113

(22) Filed: Oct. 16, 2018

(65) Prior Publication Data
US 2019/0123863 A1    Apr. 25, 2019

Related U.S. Application Data

(60) Provisional application No. 62/576,343, filed on Oct. 24, 2017.

(51) Int. Cl.
*H04L 5/00* (2006.01)
*H04B 1/00* (2006.01)
*H04W 84/12* (2009.01)

(52) U.S. Cl.
CPC ........... *H04L 5/001* (2013.01); *H04B 1/0064* (2013.01); *H04L 5/003* (2013.01); *H04L 5/0041* (2013.01); *H04L 5/0044* (2013.01); *H04W 84/12* (2013.01)

(58) Field of Classification Search
CPC ....... H04L 5/001; H04L 5/003; H04L 5/0041; H04L 5/0044; H04B 1/0064; H04W 84/12
See application file for complete search history.

(56) References Cited

U.S. PATENT DOCUMENTS

| | | | |
|---|---|---|---|
| 8,773,969 | B1 | 7/2014 | Zhang et al. |
| 8,787,385 | B2 | 7/2014 | Liu et al. |
| 10,257,806 | B2 | 4/2019 | Chu et al. |
| 10,349,413 | B2 | 7/2019 | Zhang et al. |
| 2004/0264561 | A1 * | 12/2004 | Alexander .......... H04L 25/0204 375/232 |

(Continued)

FOREIGN PATENT DOCUMENTS

| | | |
|---|---|---|
| EP | 2028809 A2 | 2/2009 |
| EP | 2999252 | 3/2016 |

(Continued)

OTHER PUBLICATIONS

Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).

(Continued)

*Primary Examiner* — Duc C Ho

(57) ABSTRACT

A single media access control (MAC) layer processor provides data to one or more baseband signal processors, which generate a plurality of baseband signals corresponding to the data provided by the MAC layer processor. The plurality of baseband signals includes at least a first baseband signal and a second baseband signal. The first baseband signal has a first frequency bandwidth and the second baseband signal has a second frequency bandwidth that is different than the first frequency bandwidth. The one or more baseband signal processors provide the plurality of baseband signals to a plurality of radio frequency (RF) radios for simultaneous wireless transmission via a plurality of RF segments.

20 Claims, 11 Drawing Sheets

(56) References Cited

U.S. PATENT DOCUMENTS

| | | | |
|---|---|---|---|
| 2011/0249659 A1* | 10/2011 | Fontaine | H04W 74/0816 370/338 |
| 2015/0098541 A1 | 4/2015 | Ben-Bassat | |
| 2016/0212748 A1 | 7/2016 | Yang et al. | |
| 2016/0241315 A1* | 8/2016 | Kwon | H04L 1/00 |
| 2017/0149547 A1 | 5/2017 | Kim et al. | |
| 2017/0181136 A1 | 6/2017 | Bharadwaj et al. | |
| 2017/0289933 A1* | 10/2017 | Segev | H04W 56/001 |
| 2017/0295571 A1* | 10/2017 | Chu | H04W 72/0413 |
| 2017/0311204 A1 | 10/2017 | Cariou et al. | |
| 2017/0325178 A1 | 11/2017 | Verma et al. | |
| 2017/0366329 A1 | 12/2017 | Cao et al. | |
| 2018/0115403 A1 | 4/2018 | Sakai et al. | |
| 2018/0160429 A1* | 6/2018 | Seok | H04L 27/2627 |
| 2018/0302858 A1 | 10/2018 | Son et al. | |
| 2019/0123863 A1 | 4/2019 | Zhang et al. | |
| 2019/0182714 A1 | 6/2019 | Chu et al. | |
| 2019/0182863 A1 | 6/2019 | Chu et al. | |
| 2019/0190752 A1* | 6/2019 | Chen | H04L 27/2071 |
| 2019/0349930 A1 | 11/2019 | Chu et al. | |

FOREIGN PATENT DOCUMENTS

| | | |
|---|---|---|
| GB | 2501898 A | 11/2013 |
| WO | WO-2006/000955 | 1/2006 |
| WO | WO-2012/026779 A2 | 3/2012 |
| WO | WO-2015/099803 A1 | 7/2015 |
| WO | WO-2017/026937 | 2/2017 |
| WO | WO-2017/111567 A2 | 6/2017 |

OTHER PUBLICATIONS

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

Invitation to Pay Additional Fees and Partial International Search Report in International Patent Application No. PCT/US2018/056055, dated Jan. 23, 2019 (18 pages).

Zhang et al., "EHT Technology Candidate Discussions," doc: IEEE 802.11-18/11611.0, *The Institute of Electrical and Electronics Engineers, Inc.*, pp. 1-10 (Jul. 8, 2018).

* cited by examiner

WIFI CHANNEL AGGREGATION

CROSS REFERENCES TO RELATED APPLICATIONS

This application claims the benefit of U.S. Provisional Patent Application No. 62/576,343, entitled "WiFi Channel Aggregation," filed on Oct. 24, 2017, which is hereby incorporated herein by reference in its entirety.

FIELD OF TECHNOLOGY

The present disclosure relates generally to wireless communication systems, and more particularly to data transmission and reception over multiple communication channels.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes: providing, by a single media access control (MAC) layer processor implemented on one or more integrated circuit (IC) devices, data to one or more baseband signal processors, wherein the one or more baseband signal processors are implemented on the one or more IC devices; generating, at the one or more baseband signal processors, a plurality of baseband signals corresponding to the data provided by the MAC layer processor, wherein the plurality of baseband signals includes at least a first baseband signal and a second baseband signal, and wherein the first baseband signal has a first frequency bandwidth and the second baseband signal has a second frequency bandwidth that is different than the first frequency bandwidth; and providing, by the one or more baseband signal processors, the plurality of baseband signals to a plurality of RF radios for simultaneous wireless transmission via a plurality of RF segments, wherein providing the plurality of baseband signals to the plurality of RF radios includes providing the first baseband signal to a first RF radio of the plurality of RF radios and providing the second baseband signal to a second RF radio of the plurality of RF radios.

In another embodiment, an apparatus comprises: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer entity; and a plurality of radio frequency (RF) radios including at least a first RF radio and a second RF radio, wherein the at least two RF radios are implemented at least partially on the one or more IC devices, and wherein the at least two RF radios are coupled to the one or more baseband signal processors; wherein the single MAC layer entity is configured to provide data to the one or more baseband signal processors; wherein the one or more baseband signal processors are configured to generate a plurality of baseband signals using the data provided by the MAC layer processor, wherein the plurality of baseband signals includes at least a first baseband signal and a second baseband signal, and wherein the first baseband signal has a first frequency bandwidth and the second baseband signal has a second frequency bandwidth that is different than the first frequency bandwidth; and wherein the one or more baseband signal processors are further configured to provide the plurality of baseband signals to the plurality of RF radios for simultaneous wireless transmission via a plurality of RF segments, wherein providing the plurality of baseband signals to the plurality of RF radios includes providing the first baseband signal to the first RF radio and providing the second baseband signal to the second RF radio.

In yet another embodiment, a method includes simultaneously receiving, at a plurality of radio frequency (RF) radios, a plurality of RF signals via a plurality of RF segments, including receiving a first RF signal at a first RF radio of the plurality of RF radios and receiving a second RF signal at a second RF radio of the plurality of RF radios; generating, at the plurality of RF radios, a plurality of baseband signals corresponding to the plurality of RF signals, including i) generating a first baseband signal corresponding to the first RF signal, and ii) generating a second baseband signal corresponding to the second RF signal, wherein the first baseband signal has a first frequency bandwidth and the second baseband signal has a second frequency bandwidth that is different than the first frequency bandwidth; providing, by the plurality of RF radios, the plurality of baseband signals to one or more baseband signal processors; generating, at the one or more baseband signal processors implemented on one or more integrated circuit (IC) devices, one or more information bit streams corresponding to the plurality of baseband signals; providing, by the one or more baseband signal processors, the one or more information bit streams to a single media access control (MAC) layer processor implemented on the one or more IC devices; and processing, at the single MAC layer processor, the one or more information bit streams.

In still another embodiment, an apparatus comprises: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer processor; and a plurality of radio frequency (RF) radios including at least a first RF radio and a second RF radio, wherein the at least two RF radios are implemented at least partially on the one or more IC devices, and wherein the at least two RF radios are coupled to the one or more baseband signal processors; wherein the plurality of RF radios are configured to simultaneously receive a plurality of RF signals via a plurality of RF segments, including i) the first RF radio being configured to receive a first RF signal and ii) the second RF radio being configured to receive a second RF signal; wherein the plurality of RF radios are further configured to generate a plurality of baseband signals corresponding to the plurality of RF signals, including i) the first RF radio being configured to generate a first baseband signal corresponding to the first RF signal, and ii) the second RF radio being configured to generate a second baseband signal corresponding to the second RF signal, wherein the first baseband signal has a first frequency bandwidth and the second baseband signal has a second frequency bandwidth that is different than the first frequency bandwidth; wherein the plurality of RF radios are further configured to provide the plurality of baseband signals to the one or more baseband signal processors; wherein the one or more baseband signal processors are configured to generate one or more information bit streams corresponding to the plurality of baseband signals; wherein the one or more baseband signal processors are further configured to provide the one or more information bit streams to the single MAC layer processor; and wherein the single MAC layer processor is configured to process the one or more information bit streams.

In another embodiment, a method includes: providing, by a single media access control (MAC) layer processor implemented on one or more integrated circuit (IC) devices, data to one or more baseband signal processors coupled to a plurality of radio frequency (RF) radios including a first RF radio and a second RF radio, wherein the data is for transmission to a single communication device; generating, at the one or more baseband signal processors, a plurality of baseband signals using the data provided by the single MAC layer processor, wherein the plurality of baseband signals includes at least a first baseband signal and a second baseband signal, and wherein the one or more baseband signal processors are implemented on the one or more IC devices; and providing, by the one or more baseband signal processors, the plurality of baseband signals to the plurality of RF radios for simultaneous wireless transmission to the single communication device via a plurality of RF segments, wherein providing the plurality of baseband signals to the plurality of RF radios includes providing the first baseband signal to the first RF radio and providing the second baseband signal to the second RF radio; wherein at least one of: i) the first baseband signal has a first frequency bandwidth and the second baseband signal has a second frequency bandwidth that is different than the first frequency bandwidth, ii) generating the plurality of baseband signals includes a) generating the first baseband signal according to a first modulation and coding scheme (MCS), and b) generating the second baseband signal according to a second MCS that is different than the first MCS, and iii) generating the plurality of baseband signals includes a) generating the first baseband signal to include a first number of spatial streams, and b) generating the second baseband signal to include a second number of spatial streams that is different than the first number of spatial streams.

In still another embodiment, an apparatus comprises: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer processor; and a plurality of radio frequency (RF) radios including a first RF radio and a second RF radio, wherein the at least two RF radios are implemented at least partially on the one or more IC devices, and wherein the at least two RF radios are coupled to the one or more baseband signal processors; wherein the single MAC layer processor is configured to provide data to the one or more baseband signal processors, wherein the data is for transmission to a single communication device; wherein the one or more baseband signal processors are configured to generate a plurality of baseband signals using the data provided by the single MAC layer processor, wherein the plurality of baseband signals includes at least a first baseband signal and a second baseband signal; wherein the one or more baseband signal processors are further configured to provide the plurality of baseband signals to the plurality of RF radios for simultaneous wireless transmission to the single communication device via a plurality of RF segments, including the one or more baseband signal processors being configured to i) provide the first baseband signal to the first RF radio and ii) provide the second baseband signal to the second RF radio; and wherein at least one of: i) the first baseband signal has a first frequency bandwidth and the second baseband signal has a second frequency bandwidth that is different than the first frequency bandwidth, ii) the one or more baseband signal processors are further configured to a) generate the first baseband signal according to a first modulation and coding scheme (MCS), and b) generate the second baseband signal according to a second MCS that is different than the first MCS, and iii) the one or more baseband signal processors are further configured to a) generate the first baseband signal to include a first number of spatial streams, and b) generate the second baseband signal to include a second number of spatial streams that is different than the first number of spatial streams.

In another embodiment, a method includes: simultaneously receiving, at a plurality of radio frequency (RF) radios, a plurality of RF signals via a plurality of RF segments, including receiving a first RF signal at a first RF radio and receiving a second RF signal at a second RF radio; respectively generating, at the plurality of RF radios, a plurality of baseband signals corresponding to the plurality of RF signals, including i) generating, at the first RF radio, a first baseband signal corresponding to the first RF signal, and ii) generating, at the second RF radio, a second baseband signal corresponding to the second RF signal; providing, by the plurality of RF radios, the plurality of baseband signals to one or more baseband signal processors; generating, at the one or more baseband signal processors, one or more information bit streams corresponding to the plurality of baseband signals, wherein the one or more baseband signal processors are implemented on one or more integrated circuit (IC) devices; providing, by the one or more baseband signal processors the one or more information bit streams to a single media access control (MAC) layer processor implemented on the one or more IC devices; and processing, at the single MAC layer processor, the one or more information bit streams; wherein at least one of: i) the first baseband signal has a first frequency bandwidth and the second baseband signal has a second frequency bandwidth that is different than the first frequency bandwidth, ii) generating the one or more information bit streams includes a) demodulating the first baseband signal according to a first modulation and coding scheme (MCS), and b) demodulating the second baseband signal according to a second MCS that is different than the first MCS, and iii) generating the one or more information bit streams includes a) deparsing the first baseband signal from a first number of spatial streams, and b) deparsing the second baseband signal from a second number of spatial streams that is different than the first number of spatial streams.

In yet another embodiment, an apparatus comprises: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer processor; and a plurality of radio frequency (RF) radios including a first RF radio and a second RF radio, wherein the at least two RF radios are implemented at least partially on the one or more IC devices, and wherein the at least two RF radios are coupled to the one or more baseband signal processors; wherein the plurality of RF radios are configured to simultaneously receive a plurality of RF signals via a plurality of RF segments, including i) the first RF radio being configured to receive a first RF signal and ii) the second RF radio being configured to receive a second RF signal; wherein the plurality of RF radios are further configured to generate a plurality of baseband signals corresponding to the plurality of RF signals, including i) the first RF radio being configured to generate a first baseband signal corresponding to the first RF signal, and ii) the second RF radio being configured to generate a second baseband signal corresponding to the second RF signal; wherein the plurality of RF radios are further configured to provide the plurality of baseband signals to the one or more baseband signal processors; wherein the one or more baseband signal processors are configured to generate one or more information bit streams corresponding to the plurality of baseband signals; wherein the one or more baseband signal processors are further configured to provide the one or more information bit streams to the single MAC layer entity; wherein the single MAC layer processor is configured to process the one or more information bit streams; and wherein at least one of: i) the first baseband signal has a first frequency bandwidth and the second baseband signal has a second frequency bandwidth that is different than the first frequency bandwidth, ii) the one or more baseband signal processors are configured to a) demodulate the first baseband signal according to a first modulation and coding scheme (MCS), and b) demodulate the second baseband signal according to a second MCS that is different than the first MCS, and iii) the one or more baseband signal processors are configured to a) deparse the first baseband signal from a first number of spatial streams, and b) deparse the second baseband signal from a second number of spatial streams that is different than the first number of spatial streams.

DETAILED DESCRIPTION

Multi-channel communication techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, multi-channel communication techniques are utilized in other types of wireless communication systems such as personal area networks (PANs), mobile communication networks such as cellular networks, metropolitan area networks (MANs), satellite communication networks, etc.

Figure 1:
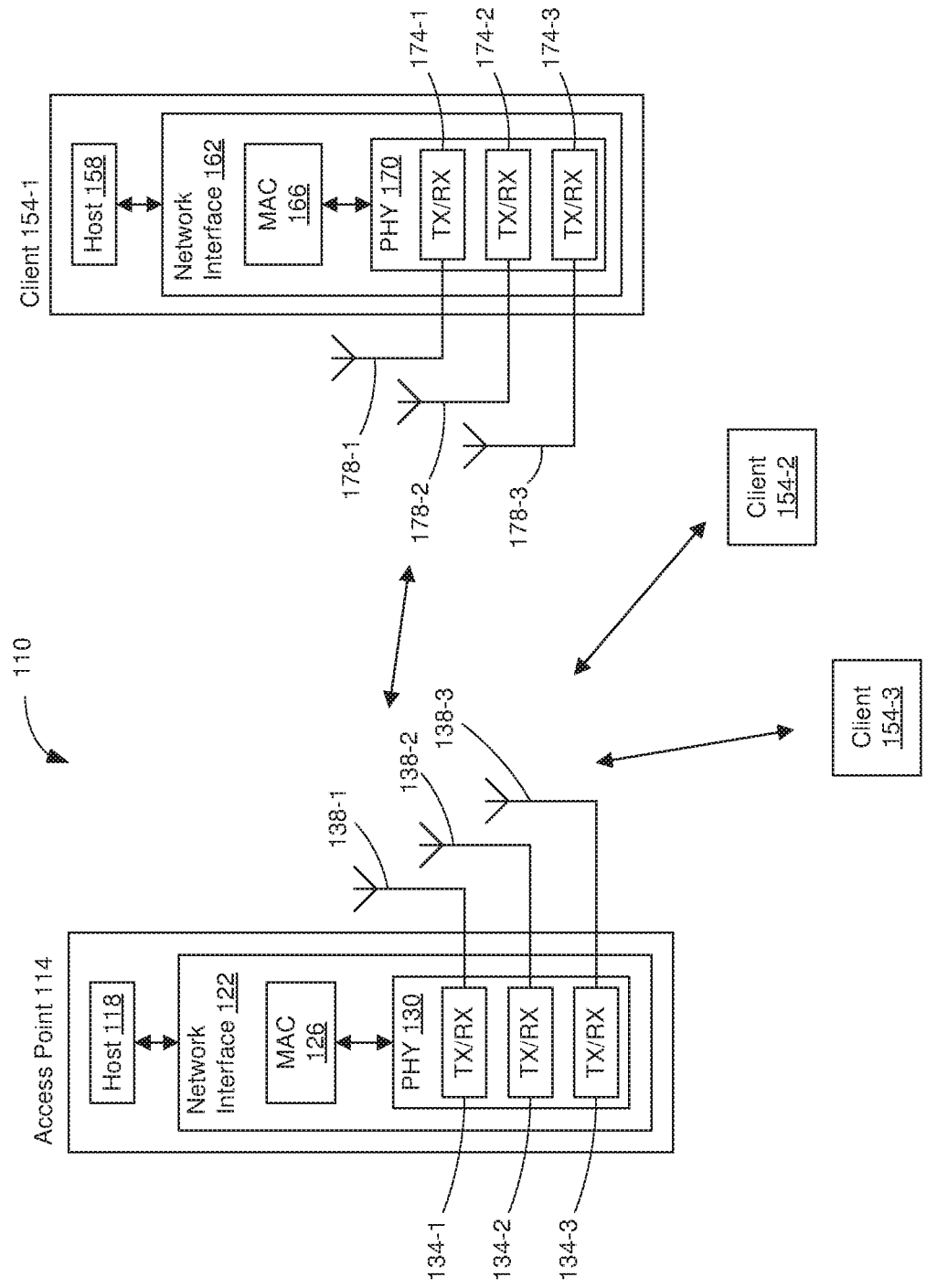
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
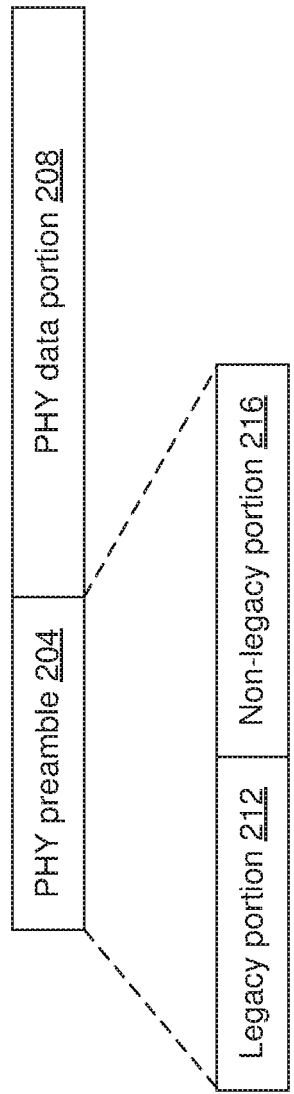
FIG. 2A is a block diagram of an example physical layer (PHY) data unit, according to an embodiment.

FIG. 2A is a diagram of an example PPDU 200 that the network interface device 122 (FIG. 1) is configured to generate and transmit to one or more client stations 154 (e.g., the client station 154-1), according to an embodiment. The network interface device 162 (FIG. 1) may also be configured to transmit data units the same as or similar to the PPDU 200 to the AP 114. The PPDU 200 may occupy a 20 MHz bandwidth or another suitable bandwidth. Data units similar to the PPDU 200 occupy other suitable bandwidth such as 40 MHz, 60 MHz, 80 MHz, 100 MHz, 120 MHz, 140 MHz, 160 MHz, 180 MHz, 200 MHz, etc., for example, or other suitable bandwidths, in other embodiments.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200.

Figure 2B:
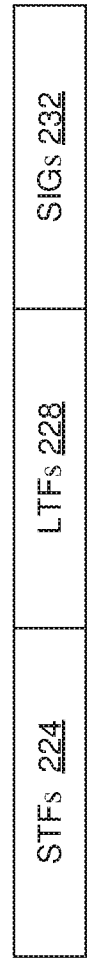
FIG. 2B is a block diagram of an example preamble of a PHY data unit, according to an embodiment.

FIG. 2B is a diagram of an example PHY preamble 220. In an embodiment, the PHY preamble 220 corresponds to the PHY preamble 204. In an embodiment, the PHY preamble 220 is included in the legacy portion 212. In another embodiment, the PHY preamble 220 is included in the non-legacy portion 216. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the number of LTFs in the LTFs 228 correspond to a number of spatial/space-time streams used for transmission of the PPDU 200. In an embodiment, the SIGs 232 are used to signal PHY communication parameters (e.g., a modulation and coding scheme (MCS), a number of spatial streams, a frequency bandwidth, etc.) corresponding to the PPDU 200.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the PPDU 200 is a multi-user (MU) orthogonal frequency division multiple access (OFDMA) data unit in which independent data streams are transmitted to multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

In an embodiment, an operating frequency band of a communication device in the WLAN 110 is divided into a plurality of smaller component channels. In an embodiment, the operating frequency band is divided into component channels, each corresponding to a width of 20 MHz, or another suitable frequency bandwidth. Multiple component channels may be concatenated to form a wider channel. For instance, a 40 MHz channel may be formed by combining two 20 MHz component channels, an 80 MHz channel may be formed by combining two 40 MHz channels, a 160 MHz channel may be formed by combining two 80 MHz channels. In an embodiment, the operating frequency band is divided into component channels of a width different than 20 MHz.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively. In some such embodiments, at least a portion of the PPDU 200 (e.g., at least a legacy portion of the PHY preamble 204, or the entirety of the PHY preamble 204) is generated by generating a field corresponding to a 20 MHz component channel bandwidth and repeating the field over a number of 20 MHz component channels corresponding to the transmission channel, in an embodiment. For example, in an embodiment in which the PPDU 200 occupies an 80 MHz channel, at least the legacy portion 212 corresponding to the 20 MHz component channel bandwidth is replicated in each of four 20 MHz component channels that comprise the 80 MHz channel.

In an embodiment, one or more communication devices in the WLAN 110 (e.g., the AP 114, the client station 154, etc.) are configured for various multi-channel operations. In an embodiment, multi-channel operation corresponds asynchronous dual-band concurrent (DBC) operation over two communication channels. For instance, in an embodiment, the AP 114 is configured to transmit a first signal in a first communication channel, and simultaneously transmit a second signal over a second communication channel. In an embodiment, the first communication channel is separated in frequency from the second communication channel, i.e., there is a gap in frequency between the first communication channel and the second communication channel. In an embodiment, the AP 114 is configured to transmit a first signal in a first communication channel, and simultaneously receive a second signal over a second communication channel. In an embodiment, the AP 114 is configured to receive a first signal in a first communication channel, and simultaneously receive a second signal over a second communication channel. In any of the above cases corresponding to DBC operation, the transmission/reception of the first signal and the second signal may be asynchronous. For instance, in an embodiment, one or both of corresponding start times and end times of the first signal and the second signal may be different.

In another embodiment corresponding to multi-channel operation, two or more communication channels may be aggregated for synchronous transmission or reception over the two or more communication channels. For instance, in an embodiment, the AP 114 is configured to transmit a first signal in a first communication channel, and simultaneously transmit a second signal over a second communication channel, wherein the AP 114 commences transmission of the first signal and the second signal at a same start time. In an embodiment, the AP 114 is configured to cease transmission of the first signal and the second signal at a same end time. In an embodiment, the AP 114 is configured to receive a first signal in a first communication channel and simultaneously receive a second signal over a second communication channel, wherein the first signal and the second signal have an identical start time. In an embodiment, the first signal in a first communication channel and the second signal identical end times. In an embodiment, the first communication channel is separated in frequency from the second communication channel, i.e., there is a gap in frequency between the first communication channel and the second communication channel.

In an embodiment corresponding to multi-channel operation, the first communication channel and the second communication channel are non-contiguous, i.e., there is a gap in frequency between the first communication channel and the second communication channel. In an embodiment, the first communication channel and the second communication channel are of different frequency bandwidths. In an embodiment, the first communication channel and the second communication channel consist of respective different numbers of component channels.

In an embodiment, multiple different frequency bands within the RF spectrum are employed for signal transmissions within the WLAN 110. In an embodiment, different communication devices (i.e., the AP 114 and the client stations 154) may be configured for operation in different frequency bands. In an embodiment, at least some communication devices (e.g., the AP 114 and the client station 154) in the WLAN 110 may be configured for operation over multiple different frequency bands. Exemplary frequency bands include, a first frequency band corresponding to a frequency range of approximately 2.4 GHz-2.5 GHz ("2 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band"). Each of the frequency bands comprise multiple component channels which may be combined within the respective frequency bands to generate channels of wider bandwidths, as described above. In an embodiment corresponding to multi-channel operation over a first communication channel and a second communication channel, the first communication channel and the second communication channel may be in separate frequency bands, or within a same frequency band.

Figure 3:
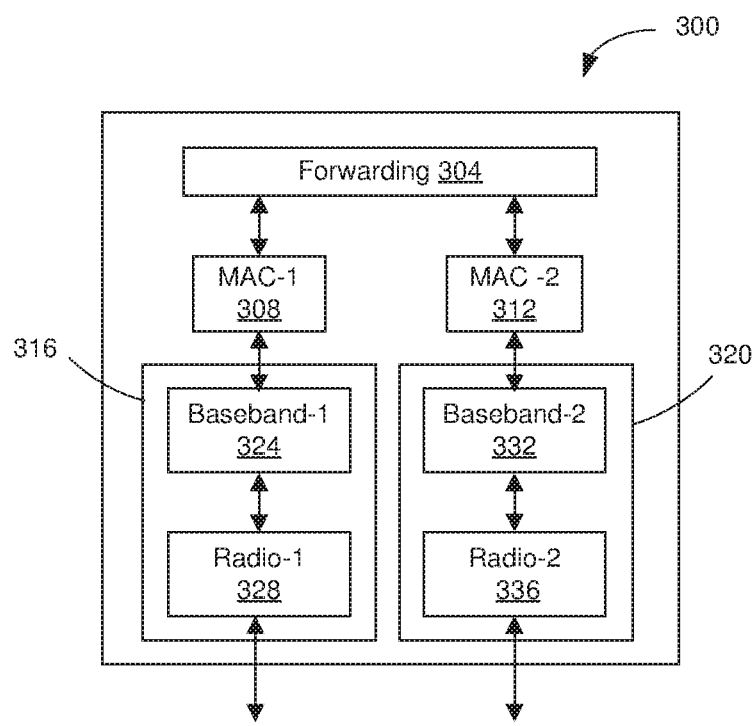
FIG. 3 is a block diagram of an example system architecture configured for multi-channel communication, according to an embodiment.

FIG. 3 is a diagram of a system architecture 300 corresponding to a communication device configured for DBC operation. In an embodiment, the communication device 300 corresponds to the AP 114. In another embodiment, the communication device 300 corresponds to the client station 154-1. In an embodiment, the communication device 300 is configured for operation over two RF bands. The communication device 300 includes a packet forwarding processor 304 configured to forward packets among the two RF bands and a WAN connection (not shown). The communication device 300 also includes a first MAC processor 308 (MAC-1), a second MAC processor 312 (MAC-2), a first PHY processor 316, and a second PHY processor 320. The first MAC processor 308 is coupled to the first PHY processor 316, and the second MAC processor 312 is coupled to the second PHY processor 320. The first MAC processor 308 exchanges frames with the first PHY processor 316, and the second MAC processor 312 exchanges frames with the second PHY processor 320.

In an embodiment, first MAC processor 308 and the second MAC processor 312 correspond to the MAC processor 126 of FIG. 1. In another embodiment, the first MAC processor 308 and the second MAC processor 312 correspond to the MAC processor 166 of FIG. 1. In an embodiment, the first PHY processor 316 and the second PHY processor 320 correspond to the PHY processor 130 of FIG. 1. In another embodiment, the first PHY processor 316 and the second PHY processor 320 correspond to the PHY processor 170 of FIG. 1.

The first PHY processor 316 includes a first baseband signal processor 316 (Baseband-1) coupled to a first RF radio 328 (Radio-1). The second PHY processor 320 includes a second baseband signal processor 332 (Baseband-2) coupled to a second RF radio 336 (Radio-2). In an embodiment, the RF radio 328 and the RF radio 336 correspond to the transceivers 134 of FIG. 1. In an embodiment, the RF radio 328 is configured to operate on a first RF band, and the RF radio 336 is configured to operate on a second RF band. In another embodiment, the RF radio 328 and the RF radio 336 are both configured to operate on the same RF band.

The MAC-1 308 is configured to generate frames and provide the frames to the Baseband-1 324. The Baseband-1 324 is configured to receive frames from the MAC-1 308, generate a baseband signal corresponding to PPDUs. The Radio-1 328 upconverts the baseband signal and generates RF signals corresponding to the PPDUs for transmission over the first communication channel via one or more antennas (not shown). Similarly, the Radio-1 328 is configured to receive RF signals corresponding to PPDUs received over the first communication channel via the one or more antennas and generate a baseband signal corresponding to the received PPDUs. The Baseband-1 324 decodes and de-encapsulates the PPDUs to generate frames and provides the frames to the MAC-1 308. The MAC-1 308 processes the frames.

Operations of the MAC-2 312, the Baseband-2 332, and the Radio-2 336 correspond to operations of the MAC-1 308, the Baseband-1 324, and the Radio-1 328 as described above, except that the MAC-2 312, the Baseband-2 332, and the Radio-2 336 operate in the second communication channel. For instance, MAC-2 312, the Baseband-2 332, and the Radio-2 336 generate/transmit PPDUs and receive/process PPDUs transmitted/received over the second communication channel.

In an embodiment corresponding to DBC operation, the MAC-1 308, the Baseband-1 324, the MAC-2 312, and the Baseband-2 332 are configured for asynchronous operation in the first communication channel and the second communication channel. For instance, transmissions/receptions in first communication channel are not synchronized or coordinated with transmissions/receptions in the second communication channel, according to an embodiment. For instance, the MAC-1 308 and the MAC-2 312 do not coordinate media access control functions, and the Baseband-1 324 and the Baseband-2 332 do not coordinate transmission timing, according to an embodiment.

In an embodiment, the forwarding processor 304 is omitted and the MAC-1 308 and the MAC-2 312 are coupled to another suitable processor (e.g., the host processor 118 (FIG. 1)) that performs one or more higher level operations corresponding to data transmission and reception over the multiple communication channels. For instance, in an embodiment, the processor performs one or more operations corresponding to Layer 3 and above, as characterized in the Open Systems Interconnection (OSI) model.

Figure 4A:
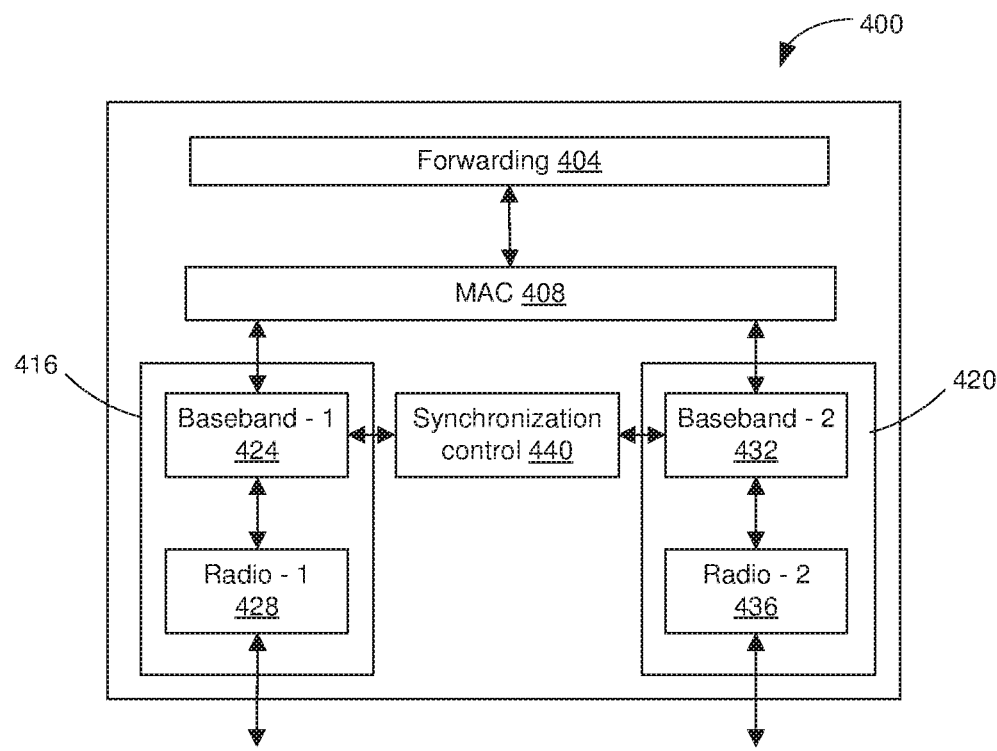
FIG. 4A is a diagram of an example system architecture corresponding to a communication device configured for multi-channel operation, according to an embodiment.

FIG. 4A is a diagram of an example system architecture 400 corresponding to a communication device configured for multi-channel operation, according to an embodiment. For instance, in an embodiment, the system architecture 400 is configured for synchronous transmission/reception over aggregated communication channels. In an embodiment, the system architecture 400 corresponds to the AP 114. In another embodiment, the system architecture 400 corresponds to the client station 154-1.

In an embodiment, the system architecture 400 is configured for operation over two communication channels and includes a forwarding processor 404. The communication device 400 also includes a single MAC processor 408, a first PHY processor 416, and a second PHY processor 420. The single MAC processor 408 is coupled to the first PHY processor 416 and the second PHY processor 420. The single MAC processor 408 exchanges frames with the first PHY processor 416 and the second PHY processor 420.

In an embodiment, the single MAC processor 408 corresponds to the MAC processor 126 of FIG. 1. In another embodiment, the single MAC processor 408 corresponds to the MAC processor 166 of FIG. 1. In an embodiment, the first PHY processor 416 and the second PHY processor 420 correspond to the PHY processor 130 of FIG. 1. In another embodiment, the first PHY processor 416 and the second PHY processor 420 correspond to the PHY processor 170 of FIG. 1.

The first PHY processor 416 includes a first baseband signal processor 424 (Baseband-1) coupled to a first RF radio 428 (Radio-1). The second PHY processor 420 includes a second baseband signal processor 432 (Baseband-2) coupled to a second RF radio 436 (Radio-2). In an embodiment, the RF radio 428 and the RF radio 436 correspond to the transceivers 134 of FIG. 1. In an embodiment, the RF radio 428 is configured to operate on a first RF band, and the RF radio 436 is configured to operate on a second RF band. In another embodiment, the RF radio 428 and the RF radio 436 are both configured to operate on the same RF band.

In an embodiment, the MAC processor 408 generates and parses data corresponding to MAC layer data units (e.g., frames) into a plurality of data streams corresponding to respective communication channels. The MAC processor 408 provides the parsed data streams to the Baseband-1 424 and the Baseband-2 432. The Baseband-1 424 and the Baseband-2 432 are configured to receive the respective data streams from the MAC processor 408, and encapsulate and encode the respective data streams to generate respective baseband signals corresponding to PPDUs. In an embodiment, the respective baseband signals have different bandwidths. The Baseband-1 424 and the Baseband-2 432 provide the respective baseband signals to the Radio-1 428 and the Radio-2 436. The Radio-1 428 and Radio-2 436 upconvert the respective baseband signals to generate respective RF signals for transmission via the first communication channel and the second communication channel, respectively. The Radio-1 820 transmits a first RF signal via the first communication channel and the Radio-2 824 transmits a second RF signal via a second communication channel.

The communication device 400 also includes synchronization control circuitry 440. The synchronization control circuitry 440 is configured to ensure that respective transmitted signals over the first communication channel and the second communication channel are synchronized. The synchronization control circuitry 440 is coupled to the Baseband-1 812 and the Baseband-2 816 to ensure that the respective baseband signals are synchronized in time.

The Radio-1 428 and the Radio-2 436 are also configured to receive respective RF signals via the first communication channel and the second communication channel, respectively. The Radio-1 428 and the Radio-2 436 generate respective baseband signals corresponding to the respective received signals. In an embodiment, the generated respective baseband signals have different bandwidths. The generated respective baseband signals are provided to the respective baseband signal processors Baseband-1 424 and Baseband-2 432. The Baseband-1 424 and the Baseband-2 432 generate respective data streams that are provided to the MAC processor 408. The MAC processor 408 processes the respective data streams. In an embodiment, the MAC processor 408 deparses the data streams received from the Baseband-1 424 and the Baseband-2 432 into a single information bit stream.

In an embodiment, the forwarding processor 404 is omitted and the MAC processor 408 is coupled to another suitable processor (e.g., the host processor 118 (FIG. 1)) that performs one or more higher level operations corresponding to data transmission and reception. For instance, in an embodiment, the other processor performs one or more operations corresponding to Layer 3 and above as characterized in the OSI model.

Figure 4B:
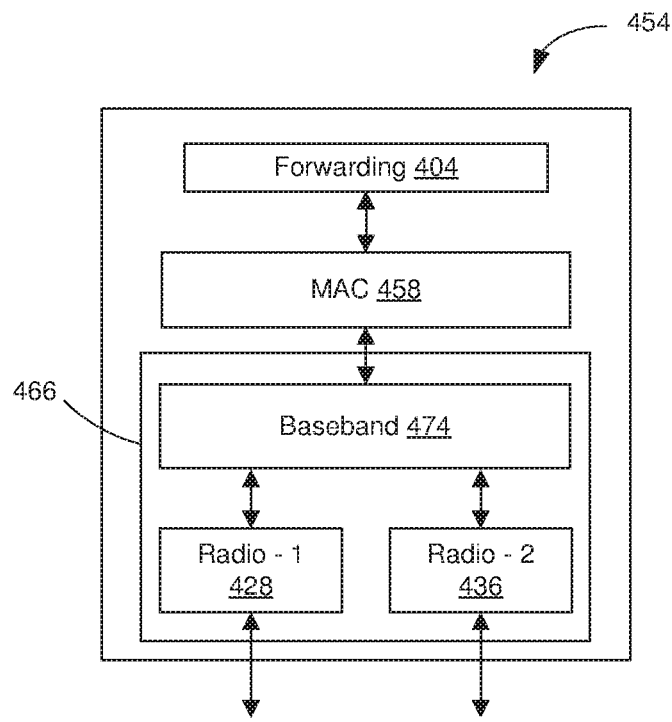
FIG. 4B is a diagram of another example system architecture corresponding to a communication device configured for multi-channel operation, according to another embodiment.

FIG. 4B is a diagram of an example system architecture 450 corresponding to a communication device configured for multi-channel operation, according to another embodiment. For instance, in an embodiment, the system architecture 450 is configured for synchronous transmission/reception over aggregated communication channels. In an embodiment, the system architecture 450 corresponds to the AP 114. In another embodiment, the system architecture 450 corresponds to the client station 154-1.

The system architecture 450 is similar to the system architecture 400 of FIG. 4A, and like-numbered elements are not discussed in detail for purposes of brevity.

The communication device 450 includes a single MAC processor 458 coupled to a PHY processor 466. The single MAC processor 408 exchanges frames with the PHY processor 466.

In an embodiment, the single MAC processor 458 corresponds to the MAC processor 126 of FIG. 1. In another embodiment, the single MAC processor 458 corresponds to the MAC processor 166 of FIG. 1. In an embodiment, the PHY processor 466 corresponds to the PHY processor 130 of FIG. 1. In another embodiment, the PHY processor 466 corresponds to the PHY processor 170 of FIG. 1.

The PHY processor 466 includes a single baseband signal processor 474. The single baseband signal processor 474 is coupled to the Radio-1 428 and the Radio-2 436.

In an embodiment, the MAC processor 458 generates data corresponding to MAC layer data units (e.g., frames) and provides the frames to the baseband signal processor 474. The baseband signal processor 474 is configured to receive frames from the MAC processor 458, and parse data corresponding to the frames into a plurality of bit streams. The baseband signal processor 474 is also configured to encapsulate and encode the respective bit streams to generate respective baseband signals corresponding to PPDUs. In an embodiment, the respective baseband signals have different bandwidths. The baseband signal processor 474 provides the respective baseband signals to the Radio-1 428 and the Radio-2 436. The Radio-1 428 and Radio-2 436 upconvert the respective baseband signals to generate respective RF signals for transmission via the first communication channel and the second communication channel, respectively. The Radio-1 820 transmits a first RF signal via the first communication channel and the Radio-2 824 transmits a second RF signal via a second communication channel.

The baseband signal processor 474 is configured to ensure that respective transmitted signals over the first communication channel and the second communication channel are synchronized. For example, the baseband signal processor 474 is configured to generate the respective baseband signals such that the respective baseband signals are synchronized in time.

The Radio-1 428 and the Radio-2 436 are also configured to receive respective RF signals via the first communication channel and the second communication channel, respectively. The Radio-1 428 and the Radio-2 436 generate respective baseband signals corresponding to the respective received signals. In an embodiment, the generated respective baseband signals have different bandwidths. The generated respective baseband signals are provided to the baseband signal processor 474. The baseband signal processor 474 generate respective bit streams, and de-parse the bit streams into a data stream corresponding to frames. The baseband signal processor 474 provides the frames to the MAC processor 458. The MAC processor 458 processes the frames.

Figure 5:
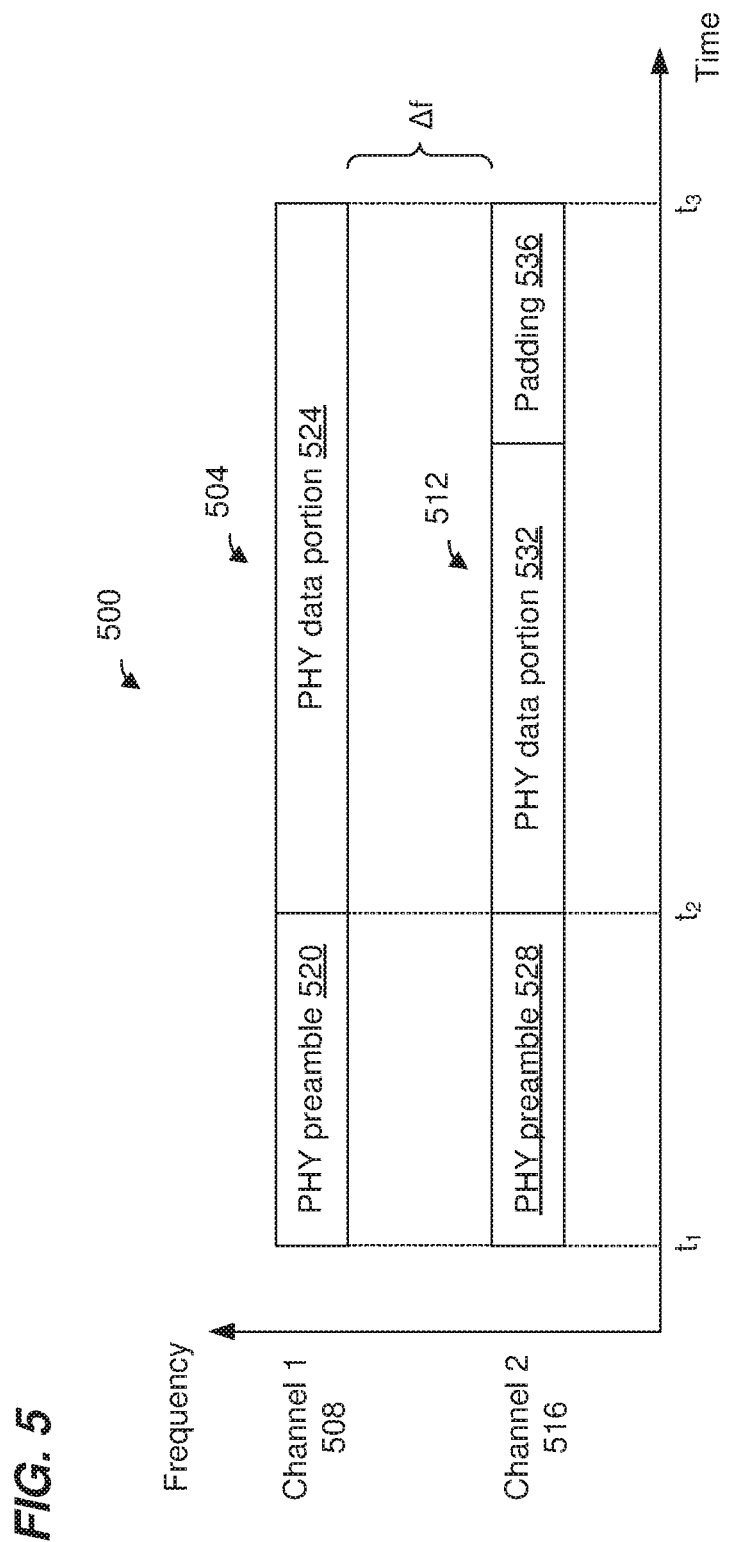
FIG. 5 is a diagram of an example signal transmission over aggregated communication channels, according to an embodiment.

FIG. 5 is a diagram of an example synchronized transmission 500 over aggregated communication channels, according to an embodiment. In an embodiment, the transmission 500 is generated and transmitted by the network interface device 122 (FIG. 1) to one or more client stations 154 (e.g., the client station 154-1). In an embodiment, the network interface device 122 generating the transmission 500 has a structure of the system architecture 400 (FIG. 4A). In another embodiment, the network interface device 122 generating the transmission 500 has a structure of the system architecture 450 (FIG. 4B). In another embodiment, the transmission 500 is generated and transmitted by the network interface device 162 (FIG. 1) to the AP 114. In an embodiment, the network interface device 162 generating the transmission 500 has a structure of the system architecture 400 (FIG. 4A). In another embodiment, the network interface device 162 generating the transmission 500 has a structure of the system architecture 450 (FIG. 4B).

In an embodiment, the transmission 500 corresponds to a single user (SU) transmission that is generated and transmitted to a single communication device. In an embodiment, the transmission 500 corresponds to a multi-user (MU) transmission that includes data for multiple communication devices (e.g., the client stations 154). For example, in an embodiment, the MU transmission 500 is an OFDMA transmission. In another embodiment, the MU transmission 500 is an MU-MIMO transmission.

The transmission 500 comprises a first RF signal 504 in a first communication channel 508 and a second RF signal 512 in a second communication channel 516. The first signal 504 comprises a PHY preamble 420 and a PHY data portion 424. The second signal 512 comprises of a PHY preamble 528, a data portion 532, and optional padding 536. The transmission 500 is synchronized such that transmission of the first signal 504 and the second signal 512 starts at a same time instance $t_1$ and ends at a same time instance $t_3$. In an embodiment, the transmission 500 is further synchronized such the PHY preamble 520 and the PHY preamble 528 are of a same duration. In an embodiment in which the PHY data portion 532 has a shorter duration than the PHY data portion 524, the PHY data portion 532 is appended with the padding 536 so that transmission of the signal 512 ends at $t_3$.

In an embodiment, the PHY preamble 520 and the PHY preamble 528 are formatted in a manner similar to the PHY preamble 204 of FIG. 2. In an embodiment, at least a portion of the PHY preamble 520 and at least a portion of the PHY preamble 528 have the same structure and/or include the same information. In an embodiment, at least a portion of the PHY preamble 520 and at least a portion of the PHY preamble 528 are identical.

In an embodiment in which the first communication channel 508 comprises multiple component channels, at least a portion of the PHY preamble 520 (e.g., a legacy portion) is generated by generating a field corresponding to one component channel and duplicating the field over one or more other component channels corresponding to the first communication channel 508. In an embodiment in which the second communication channel 516 comprises multiple component channels, at least a portion of the PHY preamble 528 (e.g., a legacy portion) is generated by generating a field corresponding to one component channel and duplicating the field over one or more other component channels corresponding to the second communication channel 516.

In various embodiments, the first communication channel 508 and the second communication channel 516 are in different RF bands or are co-located in a same RF band. In an embodiment, the RF band(s) correspond to the 2 GHz band, the 5 GHz band, and the 6 GHz bands, as described above. The first communication channel 508 and the second communication channel 516 may each be comprised of one or more of component channels. In an embodiment, a frequency bandwidth of the first communication channel 508 (i.e., a frequency bandwidth of the first signal 504) is different than a frequency bandwidth of the second communication channel 516 (i.e., a frequency bandwidth of the second signal 512). In another embodiment, the frequency bandwidth of the first communication channel 508 is the same as the frequency bandwidth of the second communication channel 516.

In an embodiment, the first communication channel 508 and the second communication channel 516 are separated in frequency. For example, a gap in frequency exists between the first communication channel 508 and the second communication channel 516. In various embodiments, the gap is at least 500 kHz, at least 1 MHz, at least 5 MHz, at least 20 MHz, etc.

In some embodiments, the first signal 504 is transmitted via a first number of spatial or space-time streams (hereinafter referred to as "spatial streams" for brevity), and the second signal 512 is transmitted via a second number of spatial streams that is different than the first number of spatial streams. In one such embodiment, the PHY preamble 520 and the PHY preamble 528 comprise a same number of LTFs even when the first signal 504 is transmitted via a first number of spatial streams and the second signal 512 is transmitted via a second number of spatial streams that is different than the first number of spatial streams. In an embodiment, the same number of LTFs correspond to one of the first signal 404 and the second signal 412 with the larger number of spatial streams. In other embodiments, the first signal 504 and the second signal 512 are transmitted via a same number of spatial streams.

In an embodiment, at least the PHY data portion 524 and at least the PHY data portion 532 employ different encoding schemes and/or modulation schemes. As an example, in an embodiment, the PHY data portion 524 is generated using a first MCS and the PHY data portion 432 is generated using a second, different MCS. In other embodiments, the PHY data portion 524 and the PHY data portion 532 are generated using a same MCS.

In an embodiment, the transmission 500 corresponds to a single PPDU, where a first frequency portion of the single PPDU is transmitted via the first channel 508 and a second frequency portion of the single PPDU is transmitted via the second channel 516. In another embodiment, the first signal 504 corresponds to a first PPDU and the second signal 512 corresponds to a second PPDU. In an embodiment, each of the PHY preambles 520 and 528, and the PHY data portions 524 and 532, are comprised of one or more OFDM symbols.

In an embodiment, the system architecture 400 (FIG. 4A) is configured to generate the transmission 500. For instance, the synchronization control circuitry 440 ensures that respective signals in communication channel 508 and communication channel 516 start at the same time instance $t_1$ and end at the same time instance $t_3$. In another embodiment, the system architecture 400 (FIG. 4A) is configured to receive at least a portion of the transmission 504 in the communication channel 508 and least a portion of the transmission 512 in communication channel 516.

In another embodiment, the system architecture 450 (FIG. 4B) is configured to generate the transmission 500. For instance, the baseband signal processor 474 is configured to generate baseband signals corresponding to the respective RF signals in the communication channel 508 and communication channel 516 such that the respective baseband signals start at a same time instance and end at a same time instance. In another embodiment, the system architecture 400 (FIG. 4B) is configured to receive at least a portion of the transmission 504 in the communication channel 508 and least a portion of the transmission 512 in communication channel 516.

Figure 6:
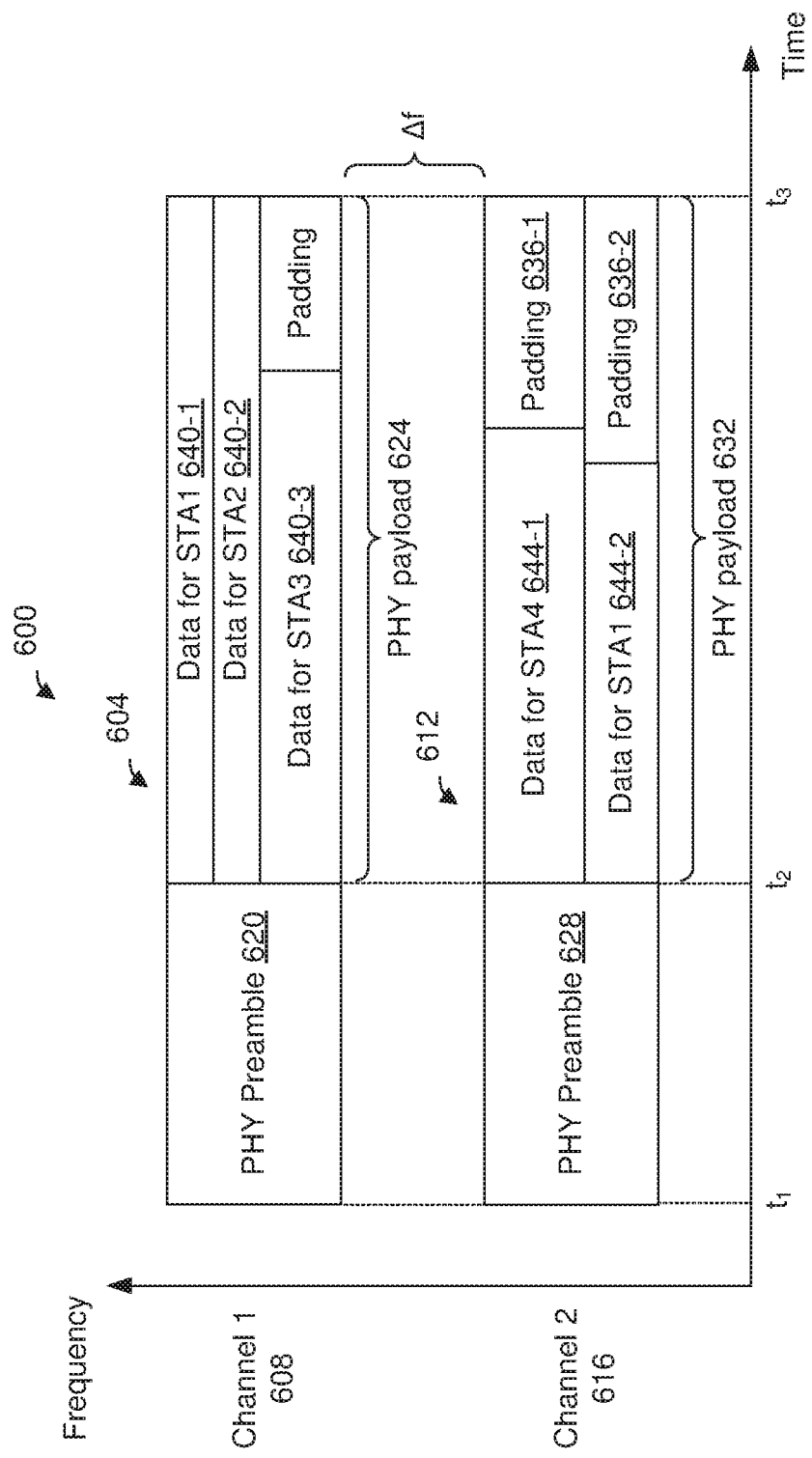
FIG. 6 is a diagram of another example signal transmission over aggregated communication channels, according to another embodiment.

FIG. 6 is a diagram of an example synchronized downlink MU OFDMA transmission 600 over an aggregated communication channel, according to an embodiment. In an embodiment, the transmission 600 is generated and transmitted by the network interface device 122 (FIG. 1) to a plurality of client stations 154. In another embodiment, the transmission 600 is generated and transmitted by the network interface device 162 (FIG. 1) to a plurality of other client stations 154 and optionally the AP 114.

The OFDMA transmission 600 comprises a first RF signal 604 in a first communication channel 608 and a second RF signal 612 in a second communication channel 616. In various embodiments, the first communication channel 608 and the second communication channel 616 are similar to the first communication channel 508 and the second communication channel 516, respectively, as described above with reference FIG. 5. The transmission 600 is synchronized such that the first RF signal 604 and the second RF signal 612 start at a same time instance $t_1$ and end at a same time instance $t_3$. In an embodiment, the transmission 600 is further synchronized such a PHY preamble 620 in the first RF signal 604 and a PHY preamble 628 in the second RF signal 628 are of a same duration.

In an embodiment, the PHY preamble 620 and the PHY preamble 628 are formatted in a manner similar to the PHY preamble 204. In an embodiment, at least a portion of the PHY preamble 620 and at least a portion of the PHY preamble 628 have the same structure and/or include the same information. In an embodiment, at least a portion of the PHY preamble 620 and at least a portion of the PHY preamble 628 are identical. In an embodiment, a portion of the PHY preamble 620 and a portion of the PHY preamble 628 include different information.

In an embodiment in which the first communication channel 608 comprises multiple component channels, at least a portion of the PHY preamble 620 (e.g., a legacy portion) is generated by generating a field corresponding to one component channel and duplicating the field over one or more other component channels corresponding to the first communication channel 608. In an embodiment in which the second communication channel 616 comprises multiple component channels, at least a portion of the PHY preamble 628 (e.g., a legacy portion) is generated by generating a field corresponding to one component channel and duplicating the field over one or more other component channels corresponding to the second communication channel 616.

In various embodiments, the first communication channel 608 and the second communication channel 616 are in different RF bands or are co-located in a same RF band. In an embodiment, the RF band(s) correspond to the 2 GHz band, the 5 GHz band, and the 6 GHz bands, as described above. The first communication channel 608 and the second communication channel 616 may each be comprised of one or more of component channels. In an embodiment, a frequency bandwidth of the first communication channel 608 (i.e., a frequency bandwidth of the first signal 604) is different than a frequency bandwidth of the second communication channel 616 (i.e., a frequency bandwidth of the second signal 612). In another embodiment, the frequency bandwidth of the first communication channel 608 is the same as the frequency bandwidth of the second communication channel 616.

In an embodiment, the first communication channel 608 and the second communication channel 616 are separated in frequency. For example, a gap in frequency exists between the first communication channel 608 and the second communication channel 616. In various embodiments, the gap is at least 500 kHz, at least 1 MHz, at least 5 MHz, at least 20 MHz, etc.

In some embodiments, the first signal 604 is transmitted via a first number of spatial streams, and the second signal 612 is transmitted via a second number of spatial streams that is different than the first number of spatial streams. In one such embodiment, the PHY preamble 620 and the PHY preamble 628 comprise a same number of LTFs even when the first signal 604 is transmitted via a first number of spatial streams and the second signal 612 is transmitted via a second number of spatial streams that is different than the first number of spatial streams. In an embodiment, the same number of LTFs correspond to one of the first signal 604 and the second signal 612 with the larger number of spatial streams. In other embodiments, the first signal 604 and the second signal 612 are transmitted via a same number of spatial streams.

In an embodiment, at least a PHY payload portion 624 and at least a PHY data payload 632 employ different encoding schemes and/or modulation schemes.

In an embodiment, the transmission 600 corresponds to a single PPDU, where a first frequency portion of the single PPDU is transmitted via the first channel 608 and a second frequency portion of the single PPDU is transmitted via the second channel 616. In another embodiment, the first signal 604 corresponds to a first PPDU and the second signal 612 corresponds to a second PPDU. In an embodiment, each of the PHY preambles 620 and 628, and the PHY payload portions 624 and 632, are comprised of one or more OFDM symbols.

The PHY payload portion 624 and the PHY payload portion 632 include respective frequency multiplexed data for respective client stations 154. Individual data within the data portion 624 are transmitted to corresponding client stations 154 in corresponding allocated RUs 640. Individual data within the data portion 632 are transmitted to corresponding client stations 154 in corresponding allocated RUs 644. In various embodiments, some or all of RUs 640/644 use different encoding schemes and/or modulation schemes. As an example, the RU 640-1 and the RU 644-1 are generated using different MCSs and/or different numbers of spatial/space-time streams, etc. In an embodiment in which a duration of data in an RU 644 is shorter than a duration of the PHY payload 624, padding 636 is appended to the data in the RU 644 to ensure the duration of the PHY payloads in both communication channels are the same.

In at least some embodiments, at least some of the client stations 154 are configured to operate only in a RF band. In such embodiments, RUs are allocated to the client station 154 only within the RF band in which the client station 154 is configured to operate. For instance STA2 and STA3 are configured to operate only in a first RF band. Hence, data corresponding to STA2 and STA3 is transmitted over RUs within the first communication channel 608, which is within the first RF band in an embodiment. Similarly, STA4 is configured to operate only in a second RF band. Hence, data corresponding to STA4 is transmitted over RUs within the second communication channel 616, which is within the second RF band in an embodiment. On the other hand, STA1 is configured for operation in both the first RF band and the second RF band. Hence, data corresponding to STA1 may be transmitted in RUs located in either or both of the first communication channel 608 and the second communication channel 616.

In an embodiment, the PHY preambles 620 and 628 include RU allocation information that indicates the allocation of RUs to client stations in the PHY payloads 624 and 632. In an embodiment, the PHY preamble 620 does not include any RU allocation information that indicates an allocation of RUs in the second channel 616, and the PHY preamble 628 does not include any RU allocation information that indicates an allocation of RUs in the first channel 608. In another embodiment, the PHY preamble 620 does include RU allocation information that indicates an allocation of at least some of the RUs in the second channel 616, and/or the PHY preamble 628 does include RU allocation information that indicates an allocation of at least some RUs in the first channel 608.

In an embodiment, the system architecture 400 (FIG. 4A) is configured to generate the transmission 600. For instance, the synchronization control circuitry 440 ensures that respective signals in communication channel 608 and communication channel 616 start at the same time instance $t_1$ and end at the same time instance $t_3$. In another embodiment, the system architecture 400 (FIG. 4A) is configured to receive at least a portion of the transmission 604 in the communication channel 608 and least a portion of the transmission 612 in communication channel 616.

In another embodiment, the system architecture 450 (FIG. 4B) is configured to generate the transmission 600. For instance, the baseband signal processor 474 is configured to generate baseband signals corresponding to the respective RF signals in the communication channel 608 and communication channel 616 such that the respective baseband signals start at a same time instance and end at a same time instance. In another embodiment, the system architecture 450 (FIG. 4B) is configured to receive at least a portion of the transmission 604 in the communication channel 608 and least a portion of the transmission 612 in communication channel 616.

Figure 7:
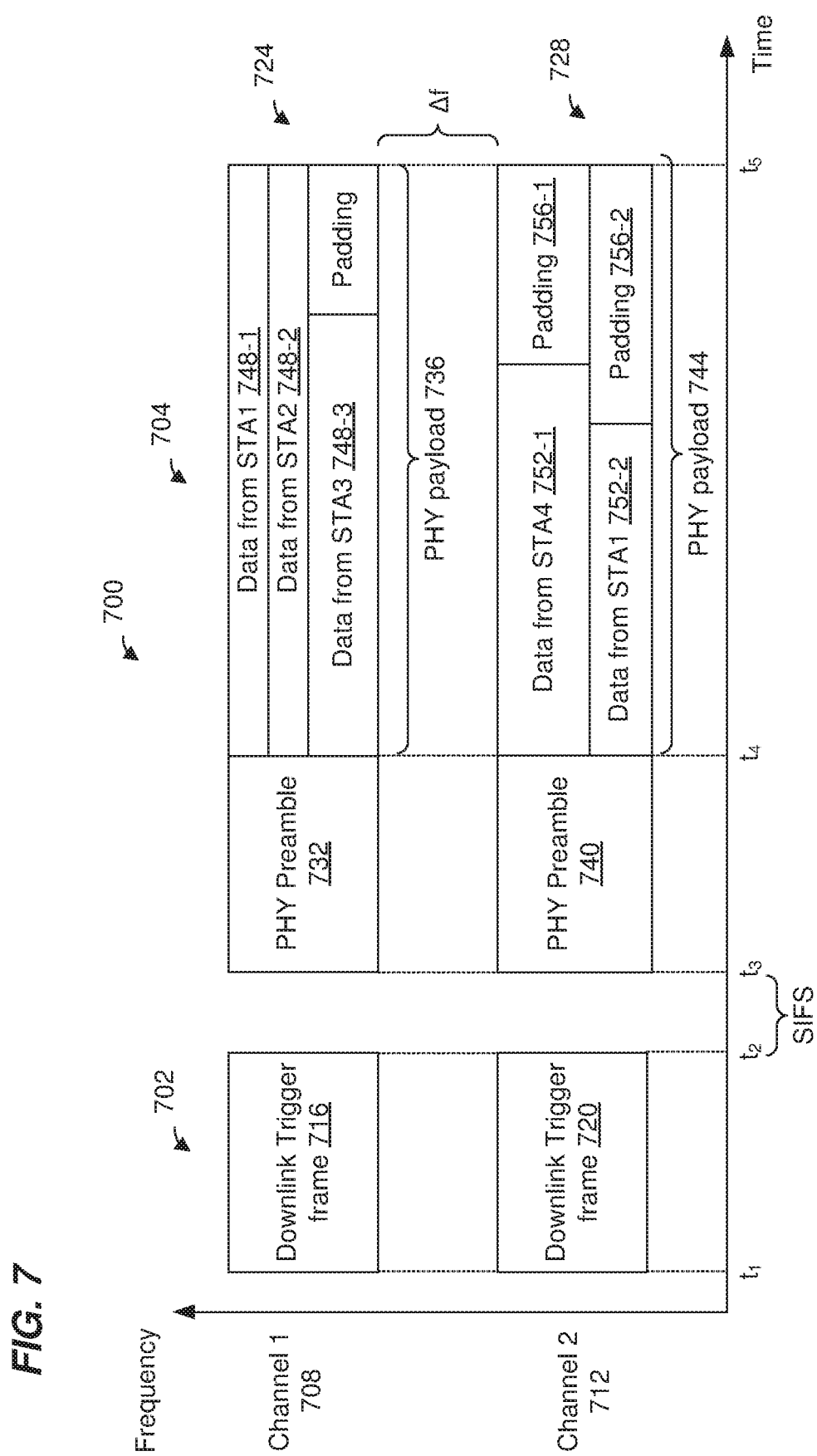
FIG. 7 is a diagram of an example signal transmission exchange over aggregated communication channels, according to another embodiment.

FIG. 7 is a diagram of an example frame exchange 700 corresponding to synchronized uplink OFDMA transmission over an aggregated communication channel, according to an embodiment. In an embodiment, devices in the WLAN 110 (e.g., the AP 114, the client stations 154) participate in the frame exchange 700.

The frame exchange 700 occurs within a first communication channel 708 and a second communication channel 712. In various embodiments, the first communication channel 608 and the second communication channel 612 are similar to the first communication channel 508 and the second communication channel 516, as described above with reference FIG. 5.

The frame exchange 700 comprises a downlink portion 702 and an uplink portion 704. The uplink portion 704 is initiated (or prompted) by a downlink trigger frame 716 and a downlink trigger frame 720 transmitted in the first communication channel 708 and the second communication channel 712, respectively. In an embodiment, the downlink trigger frames 716 and 720 are generated and transmitted by the network interface device 122 at the AP 114. The downlink trigger frames 716 and 720 are synchronized such that an RF transmission that includes the trigger frame 716 and an RF transmission that includes the trigger frame 720 start at a same time instance $t_1$ and end at a same time instance $t_2$.

In an embodiment, the downlink trigger frame 716 and the downlink trigger frame 720 include information that indicates respective RU allocations for the client stations 154 to use for the uplink portion 704. In an embodiment, the downlink trigger frame 716 does not include any RU allocation information that indicates an allocation of RUs in the second channel 712, and the trigger frame 720 does not include any RU allocation information that indicates an allocation of RUs in the first channel 708. In another embodiment, the downlink trigger frame 716 does include RU allocation information that indicates an allocation of at least some of the RUs in the second channel 712, and/or the downlink trigger frame 720 does include RU allocation information that indicates an allocation of at least some RUs in the first channel 708. For example, in an embodiment, the downlink trigger frames 716 and 720 include RU allocation information for all client stations 154 participating in the uplink portion 704.

In an embodiment, the AP 114 allocates RUs to the client station 154 only within an RF band in which the client station 154 is configured to operate. In an embodiment in which the client station 154 is capable of operation in two RF bands (e.g., one that includes the communication channel 708 and another that includes the communication channel 712), the AP 114 may allocate RUs from either or both of the communication channels 708 and 712 to the client station 154. In an embodiment in which the client station 154 is capable of operation in only one RF band, and when only one of the communication channels 708, 712 is within that RF band, the AP 114 allocates RUs to the client station 154 only within the one communication channel 708, 712 within the one RF band.

In an embodiment, the downlink trigger frames 716 and 720 are included in a single PPDU that spans both the communication channel 708 and the communication channel 712. In another embodiment, the downlink trigger frames 716 and 720 are included in corresponding separate PPDUs that respectively span the communication channel 708 and the communication channel 712. In an embodiment, a duration of the RF signals of the downlink trigger frames 716 and 720 have a same duration. In an embodiment, a transmission corresponding to at least one of the downlink trigger frames 716 and 720 includes padding (not shown) to ensure that the duration of the RF signals of the downlink trigger frames 716 and 720 have the same duration.

In response to reception of the downlink trigger frames 716 and 720, client stations 154 that have been allocated RUs for the uplink transmission portion 704 transmit as part of an uplink OFDMA transmission 704. In an embodiment, client station 154 begin transmitting as part of the uplink OFDMA transmission after a predetermined time period following an end of reception of the downlink trigger frame 716 and/or the downlink trigger frame 720. In an embodiment, the predetermined time period is a short inter-frame space (SIFS) as defined by the IEEE 802.11 Standard, or another suitable time period. The uplink OFDMA transmission 704 comprises of a first RF signal 724 in the first communication channel 708 and a second RF signal 728 in the second communication channel 712. The first signal 724 comprises a PHY preamble 732 and a PHY payload portion 736, and the second signal 728 comprises of a PHY preamble 740 and a PHY payload portion 744. The uplink OFDMA transmission 704 is synchronized such that one or more client stations 154 participating in the first signal 724 being transmitting at approximately a same time instance $t_3$, and one or more client stations 154 participating in the second signal 728 begin transmitting at approximately the same time instance $t_3$. In an embodiment, one or more client stations 154 participating in the first signal 724 stop transmitting at approximately a same time instance $t_5$, and one or more client stations 154 participating in the second signal 728 stop transmitting at approximately the same time instance $t_5$. In an embodiment, the uplink OFDMA transmission 704 is further synchronized such the PHY preamble 732 and the PHY preamble 740 are of a same duration.

In an embodiment, a client station 154 transmits as part of the PHY preambles 732/740 only in component channels in which RUs have been allocated to the client station 154.

The PHY payload portion 736 and the PHY payload 744 include respective frequency multiplexed data from respective client stations 154. Individual data 748 within the PHY payload portion 736 and individual data 752 within the PHY payload portion 744 are transmitted from corresponding client stations 154 over corresponding allocated RUs. In various embodiments, some or all of RUs 748/752 use different encoding schemes and/or modulation schemes. As an example, the RU 748-1 and the RU 752-1 are generated using different MCSs and/or different numbers of spatial/space-time streams, etc. In an embodiment in which a duration of data in an RU 752 is shorter than a duration of the PHY payload 736, padding 756 is appended to the data in the RU 752 to ensure the duration of the PHY payloads in both communication channels are the same.

In an embodiment, the uplink OFDMA transmission 704 is a single PPDU comprising the first signal 724 and the second signal 728. In other embodiments, the first signal 724 corresponds to a first PPDU and the second signal 728 corresponds to a second PPDU. In an embodiment, each of the PHY preambles 632 and 640, the data portions 636 and 644, comprises one or more OFDM symbols.

In an embodiment, the system architecture 400 (FIG. 4A) is configured to generate the downlink transmission 702. For instance, the synchronization control circuitry 440 ensures that respective signals in communication channel 708 and communication channel 712 start at the same time instance $t_1$ and end at the same time instance $t_2$. In another embodiment, the system architecture 400 (FIG. 4A) is configured to receive the uplink transmission 704 in both the communication channel 708 and communication channel 712.

In another embodiment, the system architecture 400 (FIG. 4A) is configured to generate an RF signal as part of the uplink transmission 704. For instance, when a client station 154 includes the system architecture 400, the synchronization control circuitry 440 ensures that respective signals in communication channel 708 and communication channel 712 start at the same time instance $t_3$ and end at the same time instance $t_5$. In another embodiment, the system architecture 400 (FIG. 4A) is configured to receive at least a portion of the downlink transmission 702 in both the communication channel 708 and communication channel 712.

In another embodiment, the system architecture 450 (FIG. 4B) is configured to generate the downlink transmission 702. For instance, the baseband signal processor 474 is configured to generate baseband signals corresponding to the respective RF signals in the communication channel 708 and communication channel 712 such that the respective baseband signals start at the same time instance $t_1$ and end at a same time instance $t_2$. In another embodiment, the system architecture 400 (FIG. 4A) is configured to receive the uplink transmission 704 in both the communication channel 708 and communication channel 712.

In another embodiment, the system architecture 450 (FIG. 4B) is configured to generate an RF signal as part of the uplink transmission 704. For instance, when a client station 154 includes the system architecture 400, the baseband signal processor 474 is configured to generate baseband signals corresponding to respective signals in communication channel 708 and communication channel 712 such that the respective baseband signals start at a same time instance corresponding to the transmission start time $t_3$ and end at a same time instance corresponding to the transmission end time $t_5$. In another embodiment, the system architecture 450 (FIG. 4B) is configured to receive at least a portion of the downlink transmission 702 in both the communication channel 708 and communication channel 712.

The multiple communication channels that corresponding to the multiple radios are sometimes referred to herein as "the radio channels" for ease of explanation. In some embodiments, one of the component channels across the multiple radio channels is designated as a primary sub-channel. The one radio channel that includes the designated primary sub-channel is sometimes referred to herein as "the primary radio channel". Other component channels across the multiple radio channels that are not a primary sub-channel are sometimes referred to herein as "secondary sub-channels".

Figure 8:
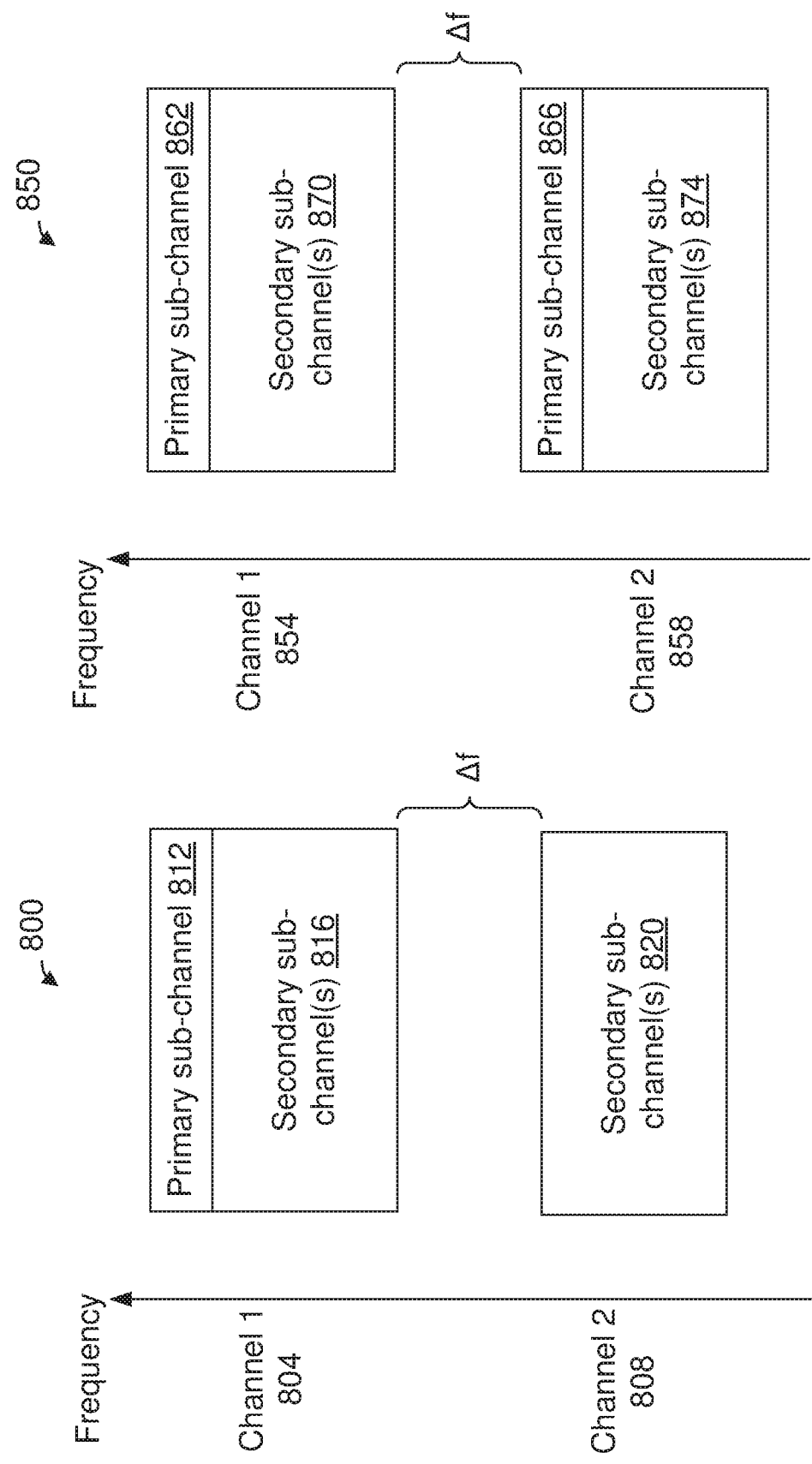
FIG. 8A is a diagram of an example channelization scheme corresponding to multiple channels, according to an embodiment.
FIG. 8B is a diagram of another example channelization scheme corresponding to multiple channels, according to another embodiment.

FIG. 8A is a diagram of an example channelization scheme 800 corresponding to multi-channel operation, according to an embodiment. In an embodiment, the channelization scheme 800 is employed for signal transmissions such as described above in reference to FIGS. 5-7, and/or for other transmissions across multiple radio channels.

The channelization scheme 800 illustrates a first communication channel 804 (also referred to herein as "the first radio channel 804") aggregated with a second communication channel 808 (also referred to herein as "the second radio channel 808"). In various embodiments, the radio channels 804 and 808 correspond to communication channels 508 and 516, communication channels 608 and 616, or communication channels 708 and 712, as described above in reference to FIG. 5, FIG. 6, and FIG. 7, respectively. In other embodiments, the radio channels 804 and 808 correspond to other suitable radio channels.

The first radio channel 804 comprises one or more component channels, and the second radio channel 808 comprises one or more component channels.

In the channelization scheme 800, a single component channel 812 in the radio channel 804 is designated as the primary sub-channel. The remaining one or more component channels 816 (if any) in the first radio channel 804 are designated as secondary sub-channels 816. Similarly, the one or more component channels 820 in the second radio channel 808 are designated as secondary sub-channels. In an embodiment, the first radio channel 804 and the second radio channel 808 are separated in frequency as described above.

In the channelization scheme 800, for transmitting or receiving a SU transmission or a MU-MIMO transmission, a communication device (e.g., the client station 154, the AP 114) must necessarily be operational in the first communication channel 704 (that includes the primary sub-channel 712). In other words, a communication device that is configured for operation in only the second communication channel 708 may not transmit or receive SU transmissions or MU-MIMO transmissions.

In an embodiment, all SU transmissions must occur in the radio channel 804, i.e., the primary radio channel 804. In other words, SU transmissions cannot be transmitted in the radio channel 808, according to an embodiment. In another embodiment, all SU transmissions must occur in, or at least overlap with, the primary radio channel 804. In other words, an SU transmission cannot be transmitted solely within the radio channel 808, according to an embodiment.

In an embodiment, all SU transmissions must occur in a composite channel that includes at least the primary sub-channel 812. In other words, SU transmissions cannot be transmitted in a composite channel that does not include the primary sub-channel 812, according to an embodiment.

In some embodiments, in connection with transmitting in a communication channel, a communication device (e.g., the AP 114 or the client station 154) performs a clear channel assessment (CCA) procedure to determine if the communication channel is busy. If the communication device determines, based on the CCA procedure, that the communication channel is busy, the communication device refrains from transmitting until a later time when the communication device determines that the communication channel is no longer busy, according to an embodiment. The CCA procedure involves measuring a signal energy level in a communication channel and comparing the measured signal energy level to a threshold, according to an embodiment. In an embodiment, the communication channel is determined to be busy if the measured signal energy level in the communication channel exceeds the threshold, according to an embodiment. The CCA procedure also involves determining whether a valid WLAN signal has been detected in the communication channel, according to an embodiment.

The CCA procedure also includes a "virtual CCA procedure", which involves checking a counter (sometimes referred to as a "network allocation vector timer" or "NAV timer") to determine whether the counter indicates the communication channel is busy. For example, when the communication device receives a valid WLAN signal, the communication device decodes duration information in a PHY header and/or a MAC header in the WLAN signal that indicates a duration during which the communication channel will be busy. The communication device then sets the NAV timer based on the duration information in the PHY header and/or the MAC header in the WLAN signal, according an embodiment. The NAV timer then counts down at a fixed rate, according an embodiment. If the NAV timer is non-zero, this indicates the communication channel is busy, whereas if the NAV timer is zero, this indicates the communication channel is not busy, according to an embodiment. Thus, in an embodiment, the virtual CCA procedure includes checking whether the NAV timer is non-zero.

In an embodiment, the CCA procedure includes performing the CCA procedure in connection with the primary sub-channel 812 to determine if a transmission in the secondary sub-channel(s) 816 can be performed. In an embodiment, the CCA procedure in connection with the primary sub-channel 812 includes measuring a signal energy level in the primary sub-channel 812 and comparing the measured signal energy level to a threshold, according to an embodiment. In an embodiment, all of the secondary sub-channels 816 in the primary radio channel 804 are assumed to be busy if the measured signal energy level in the primary sub-channel 812 exceeds the threshold.

In another embodiment, a transmission in one or more of the secondary sub-channel(s) 816 can be performed even when the CCA procedure in connection with the primary sub-channel 812 indicates that the primary sub-channel 812 is busy.

In an embodiment, the CCA procedure includes performing the CCA procedure in connection with the primary sub-channel 812 to determine if a transmission in the radio channel 808 can be performed. In an embodiment, the CCA procedure in connection with the primary sub-channel 812 includes measuring a signal energy level in the primary sub-channel 812 and comparing the measured signal energy level to a threshold, according to an embodiment. In an embodiment, all of the secondary sub-channels 820 in the radio channel 808 are assumed to be busy if the measured signal energy level in the primary sub-channel 812 exceeds the threshold.

In another embodiment, a transmission in one or more of the secondary sub-channel(s) 820 can be performed even when the CCA procedure in connection with the primary sub-channel 812 indicates that the primary sub-channel 812 is busy.

In an embodiment in which the radio channel 804 and the radio channel 808 correspond to different RF bands, and in which one or more client stations 154 are only capable of operating in only one of the RF bands, the AP 114 designates the primary sub-channel to be in the one radio channel 804/808 that corresponds to the one RF band in which the one or more client stations 154 are only capable of operating. In an embodiment in which the radio channel 804 and the radio channel 808 correspond to different RF bands, and in which one or more client stations 154 are only capable of operating in only one of the RF bands, the AP 114 is not permitted to designate the primary sub-channel to be in a radio channel 804/808 that does not correspond to the one RF band in which the one or more client stations 154 are only capable of operating.

FIG. 8B is a diagram of another example channelization scheme 850 corresponding to multi-channel operation, according to another embodiment. In an embodiment, the channelization scheme 850 is employed for signal transmissions as described above in reference to FIGS. 5-7.

The channelization scheme 850 includes a first communication channel 854 (also referred to herein as "the first radio channel 854") aggregated with a second communication channel 858 (also referred to herein as "the second radio channel 858"). In various embodiments, the radio channels 854 and 858 correspond to communication channels 508 and 516, communication channels 608 and 616, or communication channels 708 and 712, as described above in reference to FIG. 5, FIG. 6, and FIG. 7, respectively. In other embodiments, the radio channels 854 and 858 correspond to other suitable radio channels.

The first radio channel 854 comprises one or more component channels, and the second radio channel 858 comprises one or more component channels.

For the channelization scheme 850, respective primary sub-channels are designated for both radio channels 854 and 858. For example, a sub-channel 862 in the first radio channel 854 is designated as a primary sub-channel corresponding to the first radio channel 854 (sometimes referred to herein as "the first primary sub-channel 862"), and a component channel 866 in the second radio channel 858 is designated as a primary sub-channel corresponding to second radio channel 858 (sometimes referred to herein as "the second primary sub-channel 866"). The remaining one or more component channels 870 (if any) in the first radio channel 854 are designated as secondary sub-channels. Similarly, the one or more component channels 874 in the second radio channel 858 are designated as secondary sub-channels. In an embodiment, the first radio channel 854 and the second radio channel 858 are separated in frequency as described above.

In an embodiment, SU transmissions may occur in either or both of the radio channels 854, 858. For example, an SU transmission may occur only in the radio channel 854, only in the radio channel 858, or may overlap with both the radio channel 854 and the radio channel 858.

In an embodiment, all SU transmissions must occur in a composite channel that includes at least one of the primary sub-channel 862 or the primary sub-channel 866. In other words, SU transmissions cannot be transmitted in a composite channel that does not include the primary sub-channel 862 or the primary sub-channel 866, according to an embodiment.

In an embodiment, the CCA procedure includes performing the CCA procedure in connection with the primary sub-channel 862 to determine if a transmission in the secondary sub-channel(s) 870 can be performed. In an embodiment, the CCA procedure in connection with the primary sub-channel 862 includes measuring a signal energy level in the primary sub-channel 862 and comparing the measured signal energy level to a threshold, according to an embodiment. In an embodiment, all of the secondary sub-channels 870 in the radio channel 854 are assumed to be busy if the measured signal energy level in the primary sub-channel 862 exceeds the threshold.

In another embodiment, a transmission in one or more of the secondary sub-channel(s) 870 can be performed even when the CCA procedure in connection with the primary sub-channel 862 indicates that the primary sub-channel 862 is busy.

In an embodiment, the CCA procedure includes performing the CCA procedure in connection with the primary sub-channel 866 to determine if a transmission in the radio channel 858 can be performed. In an embodiment, the CCA procedure in connection with the primary sub-channel 866 includes measuring a signal energy level in the primary sub-channel 866 and comparing the measured signal energy level to a threshold, according to an embodiment. In an embodiment, all of the secondary sub-channels 874 in the radio channel 858 are assumed to be busy if the measured signal energy level in the primary sub-channel 866 exceeds the threshold.

In another embodiment, a transmission in one or more of the secondary sub-channel(s) 874 can be performed even when the CCA procedure in connection with the primary sub-channel 866 indicates that the primary sub-channel 866 is busy.

In an embodiment, the AP 114 operating according to the channelization scheme 850 transmits beacon frames in both of the primary sub-channels 862 and 866. In an embodiment, the beacon frames transmitted in both of the primary sub-channels 862 and 866 are the same beacon frame.

In an embodiment corresponding the channelization scheme 850, a communication device (e.g., the AP 114 or the client station 154) that is configured for operation in both the first communication channel 854 and the second communication channel 858 scans both the primary sub-channel 862 and the primary sub-channel 866 for packet detection. If a carrier is sensed in either of the primary sub-channel 862 or the primary sub-channel 866, it is determined that a packet has been detected. In an embodiment, a PHY header field (e.g., a SIG field in the PHY preamble 420) in the received signal may indicate a frequency bandwidth or a channel location (e.g., the first communication channel 854 and/or the second communication channel 858) of the detected packet.

In some embodiments, at least some communication devices (e.g., client stations 154) may operate according to a legacy communication protocol that does not define more than one primary sub-channel for synchronous transmission over aggregated channels. In at least some such embodiments, the legacy communication devices may be allocated for operation in only a single communication channel (e.g., one of the communication channels 754 and 758). Alternatively, the legacy communication devices may be configured for independent and asynchronous operation in both communication channels 754 and 758, such as DBC operation described above.

Figure 9:
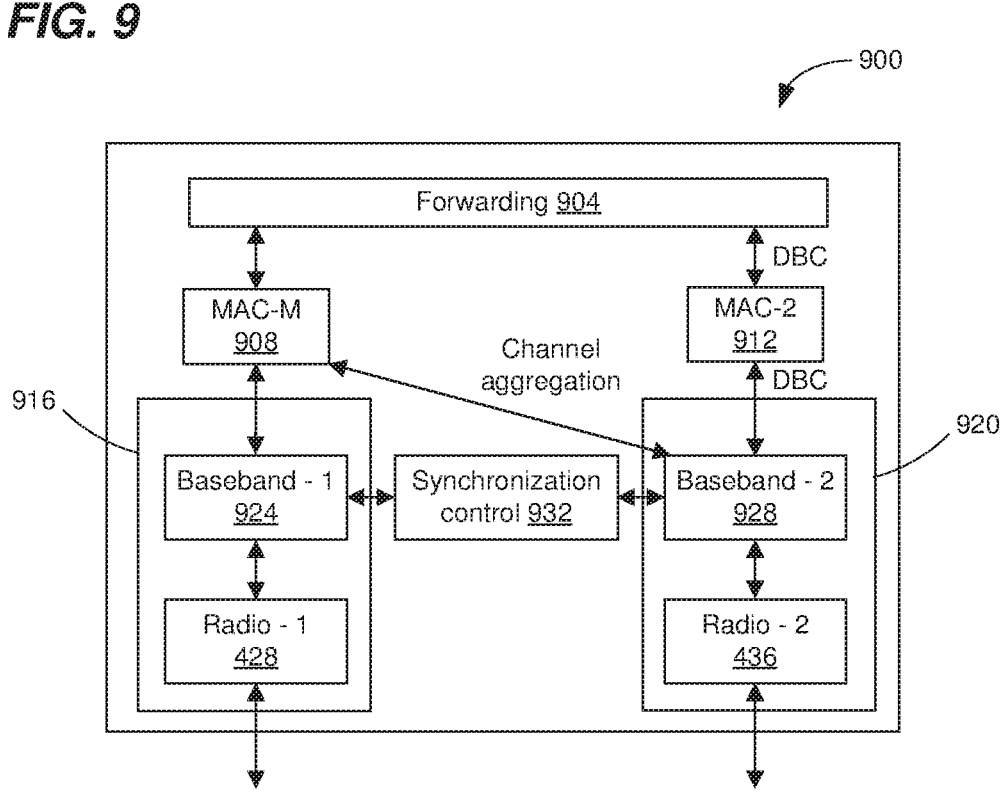
FIG. 9 is a diagram of another example system architecture corresponding to a communication device configured for multi-channel operation, according to another embodiment.

Referring again to FIGS. 3 and 4A, a network interface device is configured for operation in different modes including a DBC mode and a synchronous multi-channel mode. FIG. 9 is a diagram of an example system architecture 900 corresponding to a communication device configured for both DBC and synchronous multi-channel operation. In an embodiment, the system architecture 900 is utilized in the AP 114 or the client station 154. In an embodiment, the system architecture 900 is configured to selectively transmit and/or receive signals described above with reference to FIGS. 5-7. In an embodiment, the system architecture 900 is further configured for selective DBC operation as described above with reference to FIG. 3.

The system architecture 900 is similar to the system architecture 400 as described above with respect to FIG. 4A, and like-numbered elements not described in detail for purpose of brevity. The communication device 900 includes a packet forwarding processor 904 configured to forward packets among the two communication channels and a WAN connection (not shown). The communication device 900 also includes a master MAC processor 908 (MAC-M), a second MAC processor 912 (MAC-2), a first PHY processor 916, and a second PHY processor 920. The master MAC processor 908 is coupled to both the first PHY processor 916 and the second PHY processor 920. The second MAC processor 912 is coupled to the second PHY processor 920. The master MAC processor 908 exchanges frame data with the first PHY processor 916, and the second MAC processor 912 exchanges frame data with the second PHY processor 920. In the synchronous multi-channel mode, the master MAC processor 908 also exchanges frame data with the first PHY processor 916 while the second MAC processor 912 is idle.

In an embodiment, master MAC processor 908 and the second MAC processor 912 correspond to the MAC processor 126 of FIG. 1. In another embodiment, the master MAC processor 908 and the second MAC processor 912 correspond to the MAC processor 166 of FIG. 1. In an embodiment, the first PHY processor 916 and the second PHY processor 920 correspond to the PHY processor 130 of FIG. 1. In another embodiment, the first PHY processor 916 and the second PHY processor 920 correspond to the PHY processor 170 of FIG. 1.

The communication device 900 also includes synchronization control circuitry 932.

In the synchronous multi-channel mode, the forwarding processor 904 exchanges data only with the master MAC processor 908; and the master MAC processor 908, the first PHY processor 916, the second PHY processor 920, and the synchronization control circuitry 932 operate in a manner similar to communication device 400 of FIG. 4A. Also in the synchronous multi-channel mode, the second PHY processor 920 exchanges frame data with the master MAC processor 908 while the second MAC processor 912 is idle.

On the other hand, in the DBC mode, the forwarding processor 904 exchanges data with both the master MAC processor 908 and the second MAC processor 912; and the master MAC processor 908, the second MAC processor 912, the first PHY processor 916, and the second PHY processor 920, operate in a manner similar to communication device 300 of FIG. 3. Also in the DBC mode, the synchronization control circuitry 932 is idle.

The system architecture 900 is configured to selectively switch between the synchronous multi-channel mode and the DBC mode. In an embodiment, the choice of a particular mode of operation is determined based on the volume of traffic and/or a number of client station 154 being serviced by the AP 114. In an embodiment, if a large number of client stations 154 that can operate on both the first communication channel and the second communication channel are present in the WLAN 110, DBC operation is preferred. In an embodiment, if a large number of client stations 154 are present on a single communication channel, synchronous multi-channel operation is preferred. In an embodiment, the AP 114 may prefer synchronous multi-channel operation when the AP 114 is servicing a small number of client station 154 with a high throughput.

Figure 10:
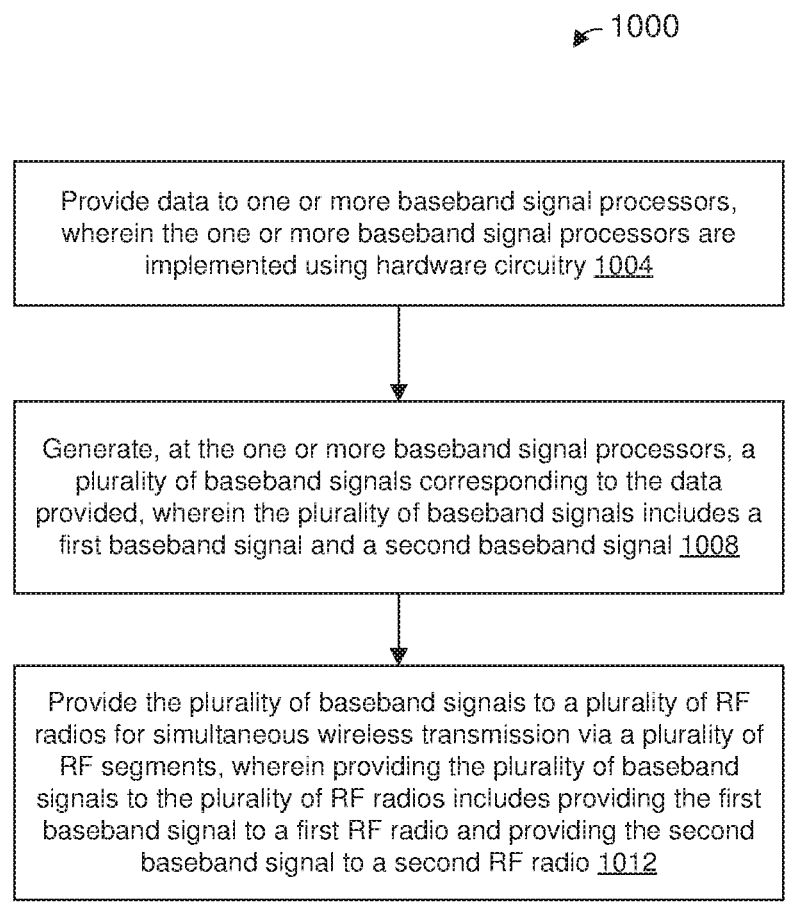
FIG. 10 is a flow diagram of an example method for signal generation and transmission over multiple communication channels, according to an embodiment.

FIG. 10 is a flow diagram of an example method 1000 for signal generation and transmission over multiple communication channels, according to an embodiment. In some embodiments, the AP 114 of FIG. 1 is configured to implement the method 1000. In an embodiment, the method 1000 is implemented by the AP 114 by utilizing the system architecture 400, the system architecture 450, or the system architecture 900 as described above with reference to FIGS. 4A-B and 9. The method 1000 is described, however, in the context of the AP 114 merely for explanatory purposes and, in other embodiments, the method 1000 is implemented by another suitable device such as the client station 154. In various embodiments, the method 1000 is utilized to generate signals corresponding to those described above in reference to FIGS. 5-7. In various embodiments, the method 1000 is utilized with channelizations such as described above in reference to FIGS. 8A-B.

At block 1004, a single MAC layer entity provides data to one or more baseband signal processors, wherein the one or more baseband signal processors are implemented using hardware circuitry. In an embodiment, the single MAC layer entity corresponds to the MAC processor 126, the MAC processor 408, the MAC processor 458, the MAC processor 908, etc. In an embodiment in which the AP 114 utilizes the system architecture 400 or the system architecture 450, the baseband signal processors correspond to the Baseband-1 912 and the Baseband-2 916. In one such embodiment, block 1004 includes the MAC layer entity parsing the data into respective data streams corresponding to Baseband-1 912 and the Baseband-2 916. In an embodiment in which the AP 114 utilizes the system architecture 850, block 1004 includes providing data to a single baseband processor, e.g., the Baseband 474.

At block 1008, the one or more baseband signal processors generate a plurality of baseband signals corresponding to the data provided by the single MAC layer entity, wherein the plurality of baseband signals includes a first baseband signal and a second baseband signal. In an embodiment in which the AP 114 utilizes the system architecture 850 that includes the single baseband signal processor 852 (Baseband 852), block 1008 includes the Baseband 852 parsing the data stream into respective RF segment streams corresponding to the first communication channel and the second communication channel, and generates the first baseband signal and the second baseband signal based on the respective RF segment streams. In an embodiment, the first baseband signal and the second baseband signal have corresponding different frequency bandwidths, MCSs, and/or numbers of spatial streams. In an embodiment, the first baseband signal and the second baseband signal are synchronized in time. In an embodiment, block 1008 includes hardware corresponding to a synchronization control circuitry (such as the synchronization control circuitry 440, the synchronization control circuitry 932, etc.) ensuring that the first baseband signal and the second baseband signal are synchronized in time. In an embodiment, the plurality of baseband signals correspond to a SU transmission or a MU transmission.

At block 1012, the one or more baseband signal processors provide the plurality of baseband signals to a plurality of RF radios for simultaneous wireless transmission via a plurality of RF segments. In an embodiment, providing the plurality of baseband signals to the plurality of RF radios includes providing the first baseband signal to a first RF radio and providing the second baseband signal to a second RF radio. In an embodiment, the first RF radio and the second RF radio correspond to the Radio-1 428 and the Radio-2 436 as described above. In an embodiment, the plurality of RF segments include at least two RF segments, wherein the two RF segments correspond to the first communication channel 508/608/708/804/854 and the second communication channel 516/616/712/808/858 as described above with reference to FIGS. 5-7 and 8A-B.

In an embodiment, the method 1000 further includes the plurality of RF radios upconverting the respective baseband signals to generate respective RF signals for transmission via the plurality of RF segments. In an embodiment, the method 1000 further includes the first RF radio transmitting a first RF signal via the first RF segment and the second RF radio transmits a second RF signal via the second RF segment. In an embodiment, the first RF signal corresponds to the first signal 504/604/724 or the downlink trigger frame 716 and the second RF signal corresponds to the second signal 512/612/728 or the downlink trigger frame 720 as described above with reference to FIGS. 5-7.

Figure 11:
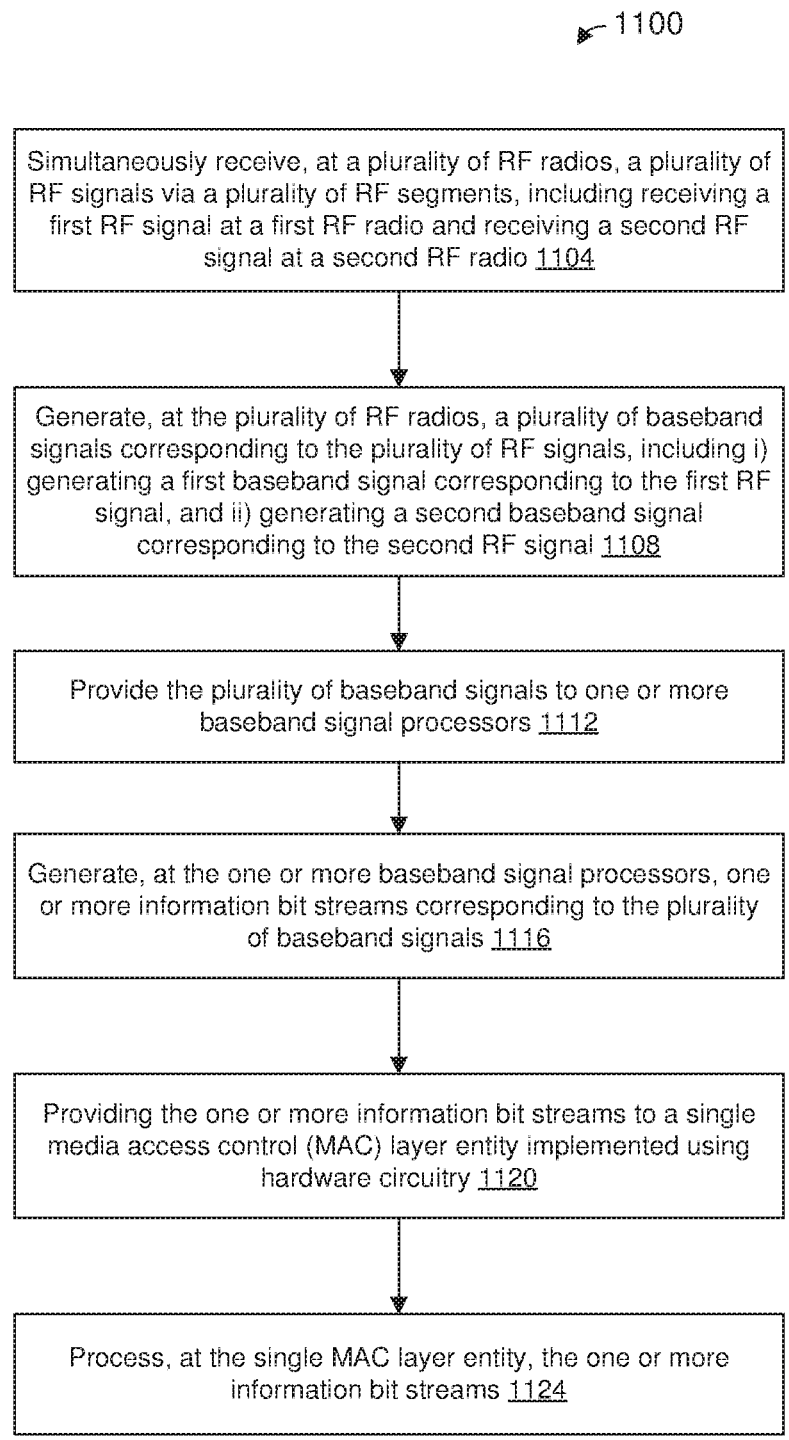
FIG. 11 is a flow diagram of an example method 1000 for signal reception over multiple communication channels, according to an embodiment.

FIG. 11 is a flow diagram of an example method 1100 for signal reception over multiple communication channels, according to an embodiment. In some embodiments, the AP 114 of FIG. 1 is configured to implement the method 1100. In an embodiment, the method 1100 is implemented by the AP 114 by utilizing the system architecture 400, the system architecture 450, or the system architecture 900 as described above with reference to FIGS. 4A-B and 9. The method 1100 is described, however, in the context of the AP 114 merely for explanatory purposes and, in other embodiments, the method 1100 is implemented by another suitable device such as the client station 154. In various embodiments, the method 1100 is utilized to receive and process signals corresponding to those described above in reference to FIGS. 5-7. In various embodiments, the method 1100 is utilized with channelizations such as described above in reference to FIGS. 8A-B.

At block 1104, a plurality of RF radios simultaneously receive a plurality of RF signals via a plurality of RF segments, including receiving a first RF signal at a first RF radio and receiving a second RF signal at a second RF radio. In an embodiment, the first RF signal is received via a first RF segment and the second RF signal is received via a second RF segment. In an embodiment, the first RF signal and the second RF signal are synchronized in time. In an embodiment, the first RF radio and the second RF radio correspond to the Radio-1 428 and the Radio-2 436 as described above. In an embodiment, the plurality of RF segments include at least two RF segments corresponding to the first communication channel 508/608/708/804/854 and the second communication channel 516/616/712/808/858 as described above with reference to FIGS. 5-7 and 8A-B. In an embodiment, the first RF signal corresponds to the first signal 504/604/724 or the downlink trigger frame 716 and the second RF signal corresponds to the second signal 512/612/728 or the downlink trigger frame 720 as described above with reference to FIGS. 5-7.

At block 1108, the plurality of RF radios generate a plurality of baseband signals corresponding to the plurality of RF signals, including i) generating a first baseband signal corresponding to the first RF signal, and ii) generating a second baseband signal corresponding to the second RF signal.

At block 1112, the plurality of RF radios provide the plurality of baseband signals to one or more baseband signal processors. In an embodiment in which the AP 114 utilizes the system architecture 400 or the system architecture 900, block 1112 includes Radio-1 428 providing the first baseband signal to the Baseband-1 424/924 and Radio-2 436 providing the second baseband signal to the Baseband-2 432/928. In an embodiment in which the AP 114 utilizes the system architecture 450, block 1112 includes Radio-1 428 and Radio-2 436 respectively providing the first baseband signal and the second baseband signal to the Baseband 474. In an embodiment, the first baseband signal and the second baseband signal have corresponding different frequency bandwidths, MCSs, and/or numbers of spatial streams.

At block 1116, the one or more baseband signal processors generate one or more information bit streams corresponding to the plurality of baseband signals. In an embodiment in which the AP 114 utilizes the system architecture 400 or the system architecture 900, block 1116 includes the baseband signal processor 424/924 and the baseband signal processor 432/928 generating respective information bit streams. In an embodiment in which the AP 114 utilizes the system architecture 450, block 1116 includes the baseband signal processor 474 generating RF segment streams corresponding to the respective baseband signals and deparses the RF segment streams to generate a single information bit stream.

At block 1120, the one or more baseband signal processors provide the one or more information bit streams to a single MAC layer entity implemented using hardware circuitry. In an embodiment, the single MAC layer entity corresponds to the MAC processor 126, the MAC processor 166, the MAC processor 408, the MAC processor 458, or the MAC processor 908.

At block 1124, the single MAC layer entity processes the one or more information bit streams. In an embodiment in which the AP 114 utilizes the system architecture 400 or the system architecture 900, block 1124 includes the single MAC layer entity deparsing the respective information bit streams from the baseband signal processor 424/924 and the baseband signal processor 432/928 to generate a single information bit stream.

Embodiment 1

A method, comprising: providing, by a single media access control (MAC) layer processor implemented on one or more integrated circuit (IC) devices, data to one or more baseband signal processors, wherein the one or more baseband signal processors are implemented on the one or more IC devices; generating, at the one or more baseband signal processors, a plurality of baseband signals corresponding to the data provided by the MAC layer processor, wherein the plurality of baseband signals includes at least a first baseband signal and a second baseband signal, and wherein the first baseband signal has a first frequency bandwidth and the second baseband signal has a second frequency bandwidth that is different than the first frequency bandwidth; and providing, by the one or more baseband signal processors, the plurality of baseband signals to a plurality of RF radios for simultaneous wireless transmission via a plurality of RF segments, wherein providing the plurality of baseband signals to the plurality of RF radios includes providing the first baseband signal to a first RF radio of the plurality of RF radios and providing the second baseband signal to a second RF radio of the plurality of RF radios.

Embodiment 2

The method of embodiment 1, wherein: providing the data to the one or more baseband signal processors comprises providing a data stream to a single baseband signal processor; generating the plurality of baseband signals comprises: parsing, at the single baseband signal processor, the data stream into a plurality of respective RF segment streams corresponding to the plurality of RF segments, and generating, at the single baseband signal processor, the plurality of baseband signals from the plurality of RF segment streams; and providing the plurality of baseband signals to the plurality of RF radios comprises, providing, by the single baseband signal processor, the plurality of baseband signals to the plurality of RF radios.

Embodiment 3

The method of embodiment 1, wherein: the method further comprises: parsing, at the single MAC layer processor, the data into a plurality of respective data streams corresponding to the plurality of RF segments; providing the data to the one or more baseband signal processors comprises: respectively providing the plurality of respective data streams to a plurality of baseband signal processors corresponding to the plurality of RF segments; generating the plurality of baseband signals comprises: respectively generating, at the plurality of baseband signal processors, the plurality of baseband signals; and providing the plurality of baseband signals to the plurality of RF radios comprises: respectively providing, by the plurality of baseband signal processors, the plurality of baseband signals to the plurality of RF radios.

Embodiment 4

The method of any of embodiments 1-3, further comprising: generating, by the plurality of RF radios, a plurality of RF signals, wherein generating the plurality of RF signals includes generating a first RF signal by the first RF radio and generating a second RF signal by the second RF radio; and transmitting, by the plurality of RF radios, the plurality of RF signals, wherein transmitting the plurality of RF signals includes transmitting the first RF signal by the first RF radio via a first RF segment among the plurality of RF segments and transmitting the second RF signal by the second RF radio via a second RF segment among the plurality of RF segments.

Embodiment 5

The method of embodiment 4, wherein the first RF segment and the second RF segment are separated in frequency.

Embodiment 6

The method of either of embodiments 4 or 5, wherein: the first RF signal and the second RF signal are of an equal time duration; and transmission of the first RF signal is synchronized in time with transmission of the second RF signal.

Embodiment 7

The method of any of embodiments 4-6, wherein a number of training fields included in a physical layer (PHY) preamble of the first RF signal is equal to a number of training fields included in a PHY preamble of the second RF signal.

Embodiment 8

The method of any of embodiments 4-7, wherein the plurality of RF signals correspond to a single user (SU) transmission to a single communication device.

Embodiment 9

The method of any of embodiments 4-7, wherein the plurality of RF signals correspond to a multi-user (MU) transmission to multiple communication devices.

Embodiment 10

The method of any of embodiments 4-9, wherein the plurality of RF signals correspond to a single physical layer (PHY) protocol data unit.

Embodiment 11

An apparatus, comprising: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer entity; and a plurality of radio frequency (RF) radios including at least a first RF radio and a second RF radio, wherein the at least two RF radios are implemented at least partially on the one or more IC devices, and wherein the at least two RF radios are coupled to the one or more baseband signal processors; wherein the single MAC layer entity is configured to provide data to the one or more baseband signal processors; wherein the one or more baseband signal processors are configured to generate a plurality of baseband signals using the data provided by the MAC layer processor, wherein the plurality of baseband signals includes at least a first baseband signal and a second baseband signal, and wherein the first baseband signal has a first frequency bandwidth and the second baseband signal has a second frequency bandwidth that is different than the first frequency bandwidth; and wherein the one or more baseband signal processors are further configured to provide the plurality of baseband signals to the plurality of RF radios for simultaneous wireless transmission via a plurality of RF segments, wherein providing the plurality of baseband signals to the plurality of RF radios includes providing the first baseband signal to the first RF radio and providing the second baseband signal to the second RF radio.

Embodiment 12

The apparatus of embodiment 11, wherein: the one or more baseband signal processors is a single baseband signal processor; the single MAC layer processor is configured to provide a data stream to the single baseband signal processor; and the single baseband signal processor is configured to: parse the data stream provided by the single MAC layer processor into a plurality of respective RF segment streams corresponding to the plurality of RF segments, generate the plurality of baseband signals from the plurality of RF segment streams, and provide the plurality of baseband signals to the plurality of RF radios.

Embodiment 13

The apparatus of embodiment 11, wherein: the one or more baseband signal processors comprises a plurality of baseband signal processors respectively corresponding to the plurality of RF segments; the single MAC layer processor is configured to: parse the data into a plurality of respective data streams corresponding to the plurality of RF segments, and respectively provide the plurality of respective data streams to the plurality of baseband signal processors; and each baseband signal processor, among the plurality of baseband signal processors, is configured to: generate a respective baseband signal corresponding to a respective RF segment using a respective data stream provided by the single MAC layer processor, and provide the respective baseband signal to the respective RF radio.

Embodiment 14

The apparatus of any of embodiments 11-13, wherein the plurality of RF radios are configured to: generate a plurality of RF signals including a first RF signal and a second RF signal, wherein the first RF radio is configured to generate the first RF signal and the second RF radio is configured to generate the second RF signal; and transmit the plurality of RF signals, wherein the first RF radio is configured to transmit the first RF signal via a first RF segment among the plurality of RF segments and the second RF radio is configured to transmit the second RF signal via a second RF segment among the plurality of RF segments.

Embodiment 15

The apparatus of embodiment 14, wherein the first RF segment and the second RF segment are separated in frequency.

Embodiment 16

The apparatus of either of embodiments 14 or 15, wherein: the first RF signal and the second RF signal are of an equal time duration; and transmission of the first RF signal is synchronized in time with transmission of the second RF signal.

Embodiment 17

The apparatus of any of embodiments 14-16, wherein a number of training fields included in a physical layer (PHY) preamble of the first RF signal is equal to a number of training fields included a PHY preamble in the second RF signal.

Embodiment 18

The apparatus of any of embodiments 14-17, wherein the plurality of RF signals correspond to a single user (SU) transmission to a single communication device.

Embodiment 19

The apparatus of any of embodiments 14-17, wherein the plurality of RF signals correspond to a multi-user (MU) transmission to multiple communication devices.

Embodiment 20

The apparatus of any of embodiments 14-19, wherein the plurality of RF signals correspond to a single physical layer (PHY) protocol data unit.

Embodiment 21

A method, comprising: simultaneously receiving, at a plurality of radio frequency (RF) radios, a plurality of RF signals via a plurality of RF segments, including receiving a first RF signal at a first RF radio of the plurality of RF radios and receiving a second RF signal at a second RF radio of the plurality of RF radios; generating, at the plurality of RF radios, a plurality of baseband signals corresponding to the plurality of RF signals, including i) generating a first baseband signal corresponding to the first RF signal, and ii) generating a second baseband signal corresponding to the second RF signal, wherein the first baseband signal has a first frequency bandwidth and the second baseband signal has a second frequency bandwidth that is different than the first frequency bandwidth; providing, by the plurality of RF radios, the plurality of baseband signals to one or more baseband signal processors; generating, at the one or more baseband signal processors implemented on one or more integrated circuit (IC) devices, one or more information bit streams corresponding to the plurality of baseband signals; providing, by the one or more baseband signal processors, the one or more information bit streams to a single media access control (MAC) layer processor implemented on the one or more IC devices; and processing, at the single MAC layer processor, the one or more information bit streams.

Embodiment 22

The method of embodiment 21, wherein: the one or more baseband signal processors is a single baseband signal processor; the one or more information bit streams is a single information bit stream; providing the plurality of baseband signals to the one or more baseband signal processors comprises providing the plurality of baseband signals to the single baseband signal processor; generating the information bit stream comprises: generating, at the single baseband signal processor, a plurality of RF segment streams corresponding to the plurality of baseband signals, and deparsing, at the single baseband signal processor, the plurality of RF segment streams into the single information bit stream; and providing the one or more information bit streams to the single MAC layer processor comprises, providing, by the single baseband signal processor, the single information bit stream to the single MAC layer processor.

Embodiment 23

The method of embodiment 21, wherein: the one or more baseband signal processors comprises a plurality of baseband signal processors; the one or more information bit streams is a plurality of RF segment streams; providing the plurality of baseband signals to the one or more baseband signal processors comprises respectively providing the plurality of baseband signals to the plurality of baseband signal processors; generating the information bit stream comprises respectively generating, at the plurality of baseband signal processors, the plurality of RF segment streams corresponding to the plurality of baseband signals; providing the one or more information bit streams to the single MAC layer processor comprises, respectively providing, by the plurality of baseband signal processors, the plurality of RF segment streams to the single MAC layer processor; and processing the one or more information bit streams comprises deparsing, at the MAC layer processor, the plurality of RF segment streams into a single information bit stream.

Embodiment 24

The method of any of embodiments 21-23, wherein receiving the plurality of RF signals via the plurality of RF segments includes receiving the first RF signal via a first RF segment and the second RF signal via a second RF segment, wherein the first RF segment and the second RF segment are non-contiguous.

Embodiment 25

The method of any of embodiments 21-24, wherein the plurality of RF signals correspond to a single user (SU) transmission corresponding to the single MAC layer processor.

Embodiment 26

The method of any of embodiments 21-24, wherein the plurality of RF signals correspond to a multi-user (MU) transmission including frequency-multiplexed data corresponding to the single MAC layer processor.

Embodiment 27

An apparatus, comprising: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer processor; and a plurality of radio frequency (RF) radios including at least a first RF radio and a second RF radio, wherein the at least two RF radios are implemented at least partially on the one or more IC devices, and wherein the at least two RF radios are coupled to the one or more baseband signal processors; wherein the plurality of RF radios are configured to simultaneously receive a plurality of RF signals via a plurality of RF segments, including i) the first RF radio being configured to receive a first RF signal and ii) the second RF radio being configured to receive a second RF signal; wherein the plurality of RF radios are further configured to generate a plurality of baseband signals corresponding to the plurality of RF signals, including i) the first RF radio being configured to generate a first baseband signal corresponding to the first RF signal, and ii) the second RF radio being configured to generate a second baseband signal corresponding to the second RF signal, wherein the first baseband signal has a first frequency bandwidth and the second baseband signal has a second frequency bandwidth that is different than the first frequency bandwidth; wherein the plurality of RF radios are further configured to provide the plurality of baseband signals to the one or more baseband signal processors; wherein the one or more baseband signal processors are configured to generate one or more information bit streams corresponding to the plurality of baseband signals; wherein the one or more baseband signal processors are further configured to provide the one or more information bit streams to the single MAC layer processor; and wherein the single MAC layer processor is configured to process the one or more information bit streams.

Embodiment 28

The apparatus of embodiment 27, wherein: the one or more baseband signal processors is a single baseband signal processor; the one or more information bit streams is a single information bit stream; the plurality of RF radios are configured to provide the plurality of baseband signals to the single baseband signal processor; and the single baseband signal processor is configured to: generate a plurality of RF segment streams corresponding to the plurality of baseband signals, deparse the plurality of RF segment streams into the single information bit stream, and provide the single information bit stream to the single MAC layer processor.

Embodiment 29

The apparatus of embodiment 27, wherein: the one or more baseband signal processors comprises a plurality of baseband signal processors; the one or more information bit streams is a plurality of RF segment streams; the plurality of RF radios are configured to respectively provide the plurality of baseband signals to the plurality of baseband signal processors; each baseband signal processor is configured to: generate a respective RF segment stream corresponding to a respective baseband signal, and provide the respective RF segment stream to the single MAC layer processor; and the MAC layer processor is configured to: deparse the plurality of RF segment streams into a single information bit stream, and process the single information bit stream.

Embodiment 30

The apparatus of any of embodiments 27-29, wherein receiving the plurality of RF signals via the plurality of RF segments includes receiving the first RF signal via a first RF segment and the second RF signal via a second RF segment, wherein the first RF segment and the second RF segment are non-contiguous.

Embodiment 31

The apparatus of any of embodiments 27-30, wherein the plurality of RF signals correspond to a single user (SU) data unit corresponding to the single MAC layer processor.

Embodiment 32

The apparatus of any of embodiments 27-30, wherein the plurality of RF signals correspond to a multi-user (MU) data unit including frequency-multiplexed data corresponding to the single MAC layer processor.

Embodiment 33

A method, comprising: providing, by a single media access control (MAC) layer processor implemented on one or more integrated circuit (IC) devices, data to one or more baseband signal processors coupled to a plurality of radio frequency (RF) radios including a first RF radio and a second RF radio, wherein the data is for transmission to a single communication device; generating, at the one or more baseband signal processors, a plurality of baseband signals using the data provided by the single MAC layer processor, wherein the plurality of baseband signals includes at least a first baseband signal and a second baseband signal, and wherein the one or more baseband signal processors are implemented on the one or more IC devices; and providing, by the one or more baseband signal processors, the plurality of baseband signals to the plurality of RF radios for simultaneous wireless transmission to the single communication device via a plurality of RF segments, wherein providing the plurality of baseband signals to the plurality of RF radios includes providing the first baseband signal to the first RF radio and providing the second baseband signal to the second RF radio; wherein at least one of: i) the first baseband signal has a first frequency bandwidth and the second baseband signal has a second frequency bandwidth that is different than the first frequency bandwidth, ii) generating the plurality of baseband signals includes a) generating the first baseband signal according to a first modulation and coding scheme (MCS), and b) generating the second baseband signal according to a second MCS that is different than the first MCS, and iii) generating the plurality of baseband signals includes a) generating the first baseband signal to include a first number of spatial streams, and b) generating the second baseband signal to include a second number of spatial streams that is different than the first number of spatial streams.

Embodiment 34

The method of embodiment 33, wherein: providing, by the single MAC layer processor, the data to the one or more baseband signal processors comprises providing a data stream to a single baseband signal processor; generating the plurality of baseband signals comprises: parsing, at the single baseband signal processor, the data stream into a plurality of respective RF segment streams corresponding to the plurality of RF segments, and generating, at the single baseband signal processor, the plurality of baseband signals from the plurality of RF segment streams; and providing the plurality of baseband signals to the plurality of RF radios comprises, providing, by the single baseband signal processor, the plurality of baseband signals to the plurality of RF radios.

Embodiment 35

The method of embodiment 33, wherein: the method further comprises: parsing, at the single MAC layer processor, the data into a plurality of respective data streams corresponding to the plurality of RF segments; providing, by the single MAC layer processor, the data to the one or more baseband signal processors comprises: respectively providing the plurality of respective data streams to a plurality of baseband signal processors corresponding to the plurality of RF segments; generating the plurality of baseband signals comprises: respectively generating, at the plurality of baseband signal processors, the plurality of baseband signals; and providing the plurality of baseband signals to the plurality of RF radios comprises: respectively providing, by the plurality of baseband signal processors, the plurality of baseband signals to the plurality of RF radios.

Embodiment 36

The method of any of embodiments 33-35, further comprising: generating, by the plurality of RF radios, a plurality of RF signals, wherein generating the plurality of RF signals includes generating a first RF signal by the first RF radio and generating a second RF signal by the second RF radio; and transmitting, from the plurality of RF radios, the plurality of RF signals, wherein transmitting the plurality of RF signals includes transmitting the first RF signal from the first RF radio via a first RF segment among the plurality of RF segments and transmitting the second RF signal from the second RF radio via a second RF segment among the plurality of RF segments.

Embodiment 37

The method of embodiment 36, wherein the first RF segment and the second RF segment are non-contiguous.

Embodiment 38

The method of either of embodiments 36 or 37, wherein: the first RF signal and the second RF signal are of an equal time duration; and transmission of the first RF signal is synchronized in time with transmission of the second RF signal.

Embodiment 39

The method of any of embodiments 36-38, wherein a number of training fields included in the first RF signal is equal to the number of training fields included in the second RF signal.

Embodiment 40

An apparatus, comprising: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer processor; and a plurality of radio frequency (RF) radios including a first RF radio and a second RF radio, wherein the at least two RF radios are implemented at least partially on the one or more IC devices, and wherein the at least two RF radios are coupled to the one or more baseband signal processors; wherein the single MAC layer processor is configured to provide data to the one or more baseband signal processors, wherein the data is for transmission to a single communication device; wherein the one or more baseband signal processors are configured to generate a plurality of baseband signals using the data provided by the single MAC layer processor, wherein the plurality of baseband signals includes at least a first baseband signal and a second baseband signal; wherein the one or more baseband signal processors are further configured to provide the plurality of baseband signals to the plurality of RF radios for simultaneous wireless transmission to the single communication device via a plurality of RF segments, including the one or more baseband signal processors being configured to i) provide the first baseband signal to the first RF radio and ii) provide the second baseband signal to the second RF radio; and wherein at least one of: i) the first baseband signal has a first frequency bandwidth and the second baseband signal has a second frequency bandwidth that is different than the first frequency bandwidth, ii) the one or more baseband signal processors are further configured to a) generate the first baseband signal according to a first modulation and coding scheme (MCS), and b) generate the second baseband signal according to a second MCS that is different than the first MCS, and iii) the one or more baseband signal processors are further configured to a) generate the first baseband signal to include a first number of spatial streams, and b) generate the second baseband signal to include a second number of spatial streams that is different than the first number of spatial streams.

Embodiment 41

The apparatus of embodiment 40, wherein: the one or more baseband signal processors is a single baseband signal processor; the single MAC layer processor is configured to provide a data stream to the single baseband signal processor; and the single baseband signal processor is configured to: parse the data stream provided by the single MAC layer processor into a plurality of respective RF segment streams corresponding to the plurality of RF segments, generate the plurality of baseband signals from the plurality of RF segment streams, and provide the plurality of baseband signals to the plurality of RF radios.

Embodiment 42

The apparatus of embodiment 40, wherein: the one or more baseband signal processors comprises a plurality of baseband signal processors respectively corresponding to the plurality of RF segments; the single MAC layer processor is configured to: parse the data into a plurality of respective data streams corresponding to the plurality of RF segments, and respectively provide the plurality of respective data streams to the plurality of baseband signal processors; and each baseband signal processor, among the plurality of baseband signal processors, is configured to: generate a respective baseband signal corresponding to a respective RF segment using a respective data stream provided by the single MAC layer processor, and provide the respective baseband signal to the respective RF radio.

Embodiment 43

The apparatus of any of embodiments 40-42, wherein the plurality of RF radios are configured to: generate a plurality of RF signals including a first RF signal and a second RF signal, wherein the first RF radio is configured to generate the first RF signal and the second RF radio is configured to generate the second RF signal; and transmit the plurality of RF signals, wherein the first RF radio is configured to transmit the first RF signal via a first RF segment among the plurality of RF segments and the second RF radio is configured to transmit the second RF signal via a second RF segment among the plurality of RF segments.

Embodiment 44

The apparatus of embodiment 43, wherein the first RF segment and the second RF segment are non-contiguous.

Embodiment 45

The apparatus of either of embodiments 43 or 44, wherein: the first RF signal and the second RF signal are of an equal time duration; and transmission of the first RF signal is synchronized in time with transmission of the second RF signal.

Embodiment 46

The apparatus of any of embodiments 43-45, wherein a number of training fields included in the first RF signal is equal to the number of training fields included in the second RF signal.

Embodiment 47

A method, comprising: simultaneously receiving, at a plurality of radio frequency (RF) radios, a plurality of RF signals via a plurality of RF segments, including receiving a first RF signal at a first RF radio and receiving a second RF signal at a second RF radio; respectively generating, at the plurality of RF radios, a plurality of baseband signals corresponding to the plurality of RF signals, including i) generating, at the first RF radio, a first baseband signal corresponding to the first RF signal, and ii) generating, at the second RF radio, a second baseband signal corresponding to the second RF signal; providing, by the plurality of RF radios, the plurality of baseband signals to one or more baseband signal processors; generating, at the one or more baseband signal processors, one or more information bit streams corresponding to the plurality of baseband signals, wherein the one or more baseband signal processors are implemented on one or more integrated circuit (IC) devices; providing, by the one or more baseband signal processors the one or more information bit streams to a single media access control (MAC) layer processor implemented on the one or more IC devices; and processing, at the single MAC layer processor, the one or more information bit streams; wherein at least one of: i) the first baseband signal has a first frequency bandwidth and the second baseband signal has a second frequency bandwidth that is different than the first frequency bandwidth, ii) generating the one or more information bit streams includes a) demodulating the first baseband signal according to a first modulation and coding scheme (MCS), and b) demodulating the second baseband signal according to a second MCS that is different than the first MCS, and iii) generating the one or more information bit streams includes a) deparsing the first baseband signal from a first number of spatial streams, and b) deparsing the second baseband signal from a second number of spatial streams that is different than the first number of spatial streams.

Embodiment 48

The method of embodiment 47, wherein: the one or more baseband signal processors is a single baseband signal processor; the one or more information bit streams is a single information bit stream; providing the plurality of baseband signals to the one or more baseband signal processors comprises providing the plurality of baseband signals to the single baseband signal processor; generating the information bit stream comprises: generating, at the single baseband signal processor, a plurality of RF segment streams corresponding to the plurality of baseband signals, and deparsing, at the single baseband signal processor, the plurality of RF segment streams into the single information bit stream; and providing the one or more information bit streams to the single MAC layer processor comprises, providing, by the single baseband signal processor, the single information bit stream to the single MAC layer processor.

Embodiment 49

The method of embodiment 47, wherein: the one or more baseband signal processors comprises a plurality of baseband signal processors; the one or more information bit streams is a plurality of RF segment streams; providing the plurality of baseband signals to the one or more baseband signal processors comprises respectively providing the plurality of baseband signals to the plurality of baseband signal processors; generating the information bit stream comprises respectively generating, at the plurality of baseband signal processors, the plurality of RF segment streams corresponding to the plurality of baseband signals; providing the one or more information bit streams to the single MAC layer processor comprises, respectively providing, by the plurality of baseband signal processors, the plurality of RF segment streams to the single MAC layer processor; and processing the one or more information bit streams comprises deparsing, at the MAC layer entity, the plurality of RF segment streams into a single information bit stream.

Embodiment 50

An apparatus, comprising: a network interface device implemented on one or more integrated circuit (IC) devices; a single media access control (MAC) layer processor implemented on the one or more IC devices; one or more baseband signal processors implemented on the one or more IC devices, wherein the one or more baseband signal processors are coupled to the single MAC layer processor; and a plurality of radio frequency (RF) radios including a first RF radio and a second RF radio, wherein the at least two RF radios are implemented at least partially on the one or more IC devices, and wherein the at least two RF radios are coupled to the one or more baseband signal processors; wherein the plurality of RF radios are configured to simultaneously receive a plurality of RF signals via a plurality of RF segments, including i) the first RF radio being configured to receive a first RF signal and ii) the second RF radio being configured to receive a second RF signal; wherein the plurality of RF radios are further configured to generate a plurality of baseband signals corresponding to the plurality of RF signals, including i) the first RF radio being configured to generate a first baseband signal corresponding to the first RF signal, and ii) the second RF radio being configured to generate a second baseband signal corresponding to the second RF signal; wherein the plurality of RF radios are further configured to provide the plurality of baseband signals to the one or more baseband signal processors; wherein the one or more baseband signal processors are configured to generate one or more information bit streams corresponding to the plurality of baseband signals; wherein the one or more baseband signal processors are further configured to provide the one or more information bit streams to the single MAC layer entity; wherein the single MAC layer processor is configured to process the one or more information bit streams; and wherein at least one of: i) the first baseband signal has a first frequency bandwidth and the second baseband signal has a second frequency bandwidth that is different than the first frequency bandwidth, ii) the one or more baseband signal processors are configured to a) demodulate the first baseband signal according to a first modulation and coding scheme (MCS), and b) demodulate the second baseband signal according to a second MCS that is different than the first MCS, and iii) the one or more baseband signal processors are configured to a) deparse the first baseband signal from a first number of spatial streams, and b) deparse the second baseband signal from a second number of spatial streams that is different than the first number of spatial streams.

Embodiment 51

The apparatus of embodiment 50, wherein: the one or more baseband signal processors is a single baseband signal processor; the one or more information bit streams is a single information bit stream; the plurality of RF radios are configured to provide the plurality of baseband signals to the single baseband signal processor; and the single baseband signal processor is configured to: generate a plurality of RF segment streams corresponding to the plurality of baseband signals, deparse the plurality of RF segment streams into the single information bit stream, and provide the single information bit stream to the single MAC layer processor.

Embodiment 52

The apparatus of embodiment 50, wherein: the one or more baseband signal processors comprises a plurality of baseband signal processors; the one or more information bit streams is a plurality of RF segment streams; the plurality of RF radios are configured to respectively provide the plurality of baseband signals to the plurality of baseband signal processors; each baseband signal processor is configured to: generate a respective RF segment stream corresponding to a respective baseband signal, and provide the respective RF segment stream to the single MAC layer processor; and the MAC layer processor is configured to: deparse the plurality of RF segment streams into a single information bit stream, and process the single information bit stream.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:

parsing, at a single media access control (MAC) layer processor implemented on one or more integrated circuit (IC) devices, data into a plurality of respective data streams corresponding to a plurality of radio frequency (RF) segments;

respectively providing, by the single MAC layer processor, the respective data streams to a plurality of baseband signal processors corresponding to the plurality of RF segments, wherein the plurality of baseband signal processors are implemented on the one or more IC devices;

respectively generating, at the plurality of baseband signal processors, a plurality of baseband signals corresponding to the data provided by the MAC layer processor, wherein the plurality of baseband signals includes at least a first baseband signal and a second baseband signal, and wherein the first baseband signal has a first frequency bandwidth and the second baseband signal has a second frequency bandwidth that is different than the first frequency bandwidth; and respectively providing, by the plurality of baseband signal processors, the plurality of baseband signals to a plurality of RF radios for simultaneous wireless transmission via the plurality of RF segments, wherein providing the plurality of baseband signals to the plurality of RF radios includes providing the first baseband signal to a first RF radio of the plurality of RF radios and providing the second baseband signal to a second RF radio of the plurality of RF radios, wherein the first RF radio is configured to operate on a first RF band that is one of i) a 2 GHz band, ii) a 5 GHz band, and iii) a 6 GHz band, and wherein the second RF radio is configured to operate on a second RF band that is another one of i) the 2 GHz band, ii) the 5 GHz band, and iii) the 6 GHz band;

generating, by the plurality of RF radios, a plurality of RF signals, wherein generating the plurality of RF signals includes generating a first RF signal by the first RF radio and generating a second RF signal by the second RF radio, and generating the first RF signal and the second RF signal to have equal time duration; and transmitting, by the plurality of RF radios, the plurality of RF signals, wherein transmitting the plurality of RF signals includes transmitting the first RF signal by the first RF radio via a first RF segment among the plurality of RF segments and transmitting the second RF signal by the second RF radio via a second RF segment among the plurality of RF segments, and transmitting the first RF signal and the second RF signal so that transmission of the first RF signal is synchronized in time with transmission of the second RF signal.

2. The method of claim 1, wherein the first RF segment and the second RF segment are separated in frequency.

3. The method of claim 1, wherein a number of training fields included in a physical layer (PHY) preamble of the first RF signal is equal to a number of training fields included in a PHY preamble of the second RF signal.

4. The method of claim 1, wherein the plurality of RF signals correspond to a single user (SU) transmission to a single communication device.

5. The method of claim 1, wherein the plurality of RF signals correspond to a multi-user (MU) transmission to multiple communication devices.

6. The method of claim 1, wherein the plurality of RF signals correspond to a single physical layer (PHY) protocol data unit.

7. An apparatus, comprising:

a network interface device implemented on one or more integrated circuit (IC) devices;

a single media access control (MAC) layer processor implemented on the one or more IC devices;

a plurality of baseband signal processors implemented on the one or more IC devices, wherein the plurality of baseband signal processors are coupled to the single MAC layer entity; and a plurality of radio frequency (RF) radios corresponding to a plurality of RF segments, the plurality of RF radios including at least a first RF radio and a second RF radio, wherein the first RF radio is configured to operate on a first RF band that is one of i) a 2 GHz band, ii) a 5 GHz band, and iii) a 6 GHz band, and wherein the second RF radio is configured to operate on a second RF band that is another one of i) the 2 GHz band, ii) the 5 GHz band, and iii) the 6 GHz band, wherein the at least two RF radios are implemented at least partially on the one or more IC devices, and wherein the at least two RF radios are coupled to the plurality of baseband signal processors;

wherein the single MAC layer entity is configured to parse data into a plurality of respective data streams corresponding to the plurality of RF segments and respectively provide data to the plurality of baseband signal processors;

wherein the each baseband signal processor is configured to generate a respective baseband signal corresponding to a respective RF segment using the a respective data stream provided by the single MAC layer processor, wherein the plurality of baseband signals includes at least a first baseband signal and a second baseband signal, and wherein the first baseband signal has a first frequency bandwidth and the second baseband signal has a second frequency bandwidth that is different than the first frequency bandwidth;

wherein the plurality of baseband signal processors are further configured to respectively provide the plurality of baseband signals to respective RF radios for simultaneous wireless transmission via the plurality of RF segments, wherein respectively providing the plurality of baseband signals to the plurality of RF radios includes providing the first baseband signal to the first RF radio and providing the second baseband signal to the second RF radio; and wherein the plurality of RF radios are configured to:

generate a plurality of RF signals including a first RF signal and a second RF signal, wherein the first RF radio is configured to generate the first RF signal and the second RF radio is configured to generate the second RF signal, and wherein the first RF signal and the second RF signal are of an equal time duration, and transmit the plurality of RF signals, wherein the first RF radio is configured to transmit the first RF signal via a first RF segment among the plurality of RF segments and the second RF radio is configured to transmit the second RF signal via a second RF segment among the plurality of RF segments, and wherein transmission of the first RF signal is synchronized in time with transmission of the second RF signal.

8. The apparatus of claim 7, wherein the first RF segment and the second RF segment are separated in frequency.

9. The apparatus of claim 7, wherein a number of training fields included in a physical layer (PHY) preamble of the first RF signal is equal to a number of training fields included a PHY preamble in the second RF signal.

10. The apparatus of claim 7, wherein the plurality of RF signals correspond to a single user (SU) transmission to a single communication device.

11. The apparatus of claim 7, wherein the plurality of RF signals correspond to a multi-user (MU) transmission to multiple communication devices.

12. The apparatus of claim 7, wherein the plurality of RF signals correspond to a single physical layer (PHY) protocol data unit.

13. A method, comprising:
  simultaneously receiving, at a plurality of radio frequency (RF) radios, a plurality of RF signals via a plurality of RF segments, including receiving a first RF signal at a first RF radio of the plurality of RF radios and receiving a second RF signal at a second RF radio of the plurality of RF radios, wherein the first RF signal is received via a first RF band that is one of i) a 2 GHz band, ii) a 5 GHz band, and iii) a 6 GHz band, and wherein the second RF signal is received via a second RF band that is another one of i) the 2 GHz band, ii) the 5 GHz band, and iii) the 6 GHz band;
  generating, at the plurality of RF radios, a plurality of baseband signals corresponding to the plurality of RF signals, including i) generating a first baseband signal corresponding to the first RF signal, and ii) generating a second baseband signal corresponding to the second RF signal, wherein the first baseband signal has a first frequency bandwidth and the second baseband signal has a second frequency bandwidth that is different than the first frequency bandwidth;
  respectively providing, by the plurality of RF radios, the plurality of baseband signals to a plurality of baseband signal processors;
  respectively generating, at the plurality of baseband signal processors implemented on one or more integrated circuit (IC) devices, a plurality of RF segment streams corresponding to the plurality of baseband signals;
  providing, by the plurality of baseband signal processors, the plurality of RF segment streams to a single media access control (MAC) layer processor implemented on the one or more IC devices; and
  processing, at the single MAC layer processor, the one or more information bit streams, including deparsing, at the MAC layer processor, the plurality of RF segment streams into a single information bit stream.

14. The method of claim 13, wherein receiving the plurality of RF signals via the plurality of RF segments includes receiving the first RF signal via a first RF segment and the second RF signal via a second RF segment, wherein the first RF segment and the second RF segment are non-contiguous.

15. The method of claim 13, wherein the plurality of RF signals correspond to a single user (SU) transmission corresponding to the single MAC layer processor.

16. The method of claim 13, wherein the plurality of RF signals correspond to a multi-user (MU) transmission including frequency-multiplexed data corresponding to the single MAC layer processor.

17. An apparatus, comprising:
  a network interface device implemented on one or more integrated circuit (IC) devices;
  a single media access control (MAC) layer processor implemented on the one or more IC devices;
  a plurality of baseband signal processors implemented on the one or more IC devices, wherein the one or more baseband signal processors are coupled to the single MAC layer processor; and
  a plurality of radio frequency (RF) radios including at least a first RF radio and a second RF radio, wherein the first RF radio is configured to operate on a first RF band that is one of i) a 2 GHz band, ii) a 5 GHz band, and iii) a 6 GHz band, and wherein the second RF radio is configured to operate on a second RF band that is another one of i) the 2 GHz band, ii) the 5 GHz band, and iii) the 6 GHz band, wherein the at least two RF radios are implemented at least partially on the one or more IC devices, and wherein the at least two RF radios are coupled to the one or more baseband signal processors;
  wherein the plurality of RF radios are configured to simultaneously receive a plurality of RF signals via a plurality of RF segments, including i) the first RF radio being configured to receive a first RF signal and ii) the second RF radio being configured to receive a second RF signal;
  wherein the plurality of RF radios are further configured to generate a plurality of baseband signals corresponding to the plurality of RF signals, including i) the first RF radio being configured to generate a first baseband signal corresponding to the first RF signal, and ii) the second RF radio being configured to generate a second baseband signal corresponding to the second RF signal, wherein the first baseband signal has a first frequency bandwidth and the second baseband signal has a second frequency bandwidth that is different than the first frequency bandwidth;
  wherein the plurality of RF radios are further configured to respectively provide the plurality of baseband signals to the plurality of baseband signal processors;
  wherein the each baseband signal processor is configured to:
    generate a respective RF segment stream corresponding to a respective baseband signal, and
    provide the respective RF segment stream to the single MAC layer processor;
  wherein the one or more baseband signal processors are further configured to provide the one or more information bit streams to the single MAC layer processor; and
  wherein the single MAC layer processor is configured to:
    deparse the plurality of RF segment streams into a single information bit stream, and
    process the single information bit stream.

18. The apparatus of claim 17, wherein receiving the plurality of RF signals via the plurality of RF segments includes receiving the first RF signal via a first RF segment and the second RF signal via a second RF segment, wherein the first RF segment and the second RF segment are non-contiguous.

19. The apparatus of claim 17, wherein the plurality of RF signals correspond to a single user (SU) data unit corresponding to the single MAC layer processor.

20. The apparatus of claim 17, wherein the plurality of RF signals correspond to a multi-user (MU) data unit including frequency-multiplexed data corresponding to the single MAC layer processor.

* * * * *